(12) United States Patent
Gagnon

(10) Patent No.: US 10,710,190 B2
(45) Date of Patent: Jul. 14, 2020

(54) WELDING GUN WITH LOCKABLE ROTATION MECHANISM

(71) Applicant: HENLEX INC., Montréal (CA)

(72) Inventor: Michel Gagnon, Montréal (CA)

(73) Assignee: HENLEX INC., Montreal, (Quebec) (CA)

( * ) Notice: Subject to any disclaimer, the term of this patent is extended or adjusted under 35 U.S.C. 154(b) by 361 days.

(21) Appl. No.: 15/752,305

(22) PCT Filed: Aug. 10, 2016

(86) PCT No.: PCT/CA2016/050931
§ 371 (c)(1),
(2) Date: Feb. 13, 2018

(87) PCT Pub. No.: WO2017/024400
PCT Pub. Date: Feb. 16, 2017

(65) Prior Publication Data
US 2018/0229326 A1 Aug. 16, 2018

Related U.S. Application Data

(60) Provisional application No. 62/204,529, filed on Aug. 13, 2015.

(51) Int. Cl.
*B23K 9/28* (2006.01)
*B23K 9/32* (2006.01)

(52) U.S. Cl.
CPC ............. *B23K 9/287* (2013.01); *B23K 9/32* (2013.01)

(58) Field of Classification Search
CPC .................................. B23K 9/287; B23K 9/32
See application file for complete search history.

(56) References Cited

U.S. PATENT DOCUMENTS

| 1,508,689 A | * | 9/1924 | Glasser | ................. B23K 9/133 219/124.03 |
| 4,161,643 A | | 7/1979 | Martin, Jr. et al. | |

(Continued)

FOREIGN PATENT DOCUMENTS

| SU | 1687398 A1 | 10/1991 |
| WO | 2010028645 A1 | 3/2010 |

OTHER PUBLICATIONS

MK Products, Prince XL Push-Pull Pistol Grip Gun, Cobramatic Push-Pull, www.MKProducts.com.

(Continued)

*Primary Examiner* — David P Angwin
*Assistant Examiner* — Bob Zadeh
(74) *Attorney, Agent, or Firm* — Dilworth IP, LLC

(57) ABSTRACT

A welding gun is provided that includes an elongated body having a longitudinal axis, a neck assembly connectable to the elongated body, and a handle including a sleeve portion mounted around and longitudinally fixed relative to the elongated body, and a grasping portion extending lengthwise radially outwardly from the sleeve portion. The welding gun also includes a rotation mechanism including an inner structure fixedly provided along an outer periphery of the elongated body and having a number of circumferentially distributed engaging elements, and an outer structure fixedly provided along an inner periphery of the sleeve portion and having a number of circumferentially distributed engaging elements. The engaging elements of the outer structure cooperate with the engaging elements of the inner structure for releasably locking the elongated body into a plurality of discrete angular positions relative to the sleeve portion about the longitudinal axis.

20 Claims, 21 Drawing Sheets

(56) References Cited

U.S. PATENT DOCUMENTS

| | | | |
|---|---|---|---|
| 4,549,068 A | 10/1985 | Kensrue | |
| 4,727,238 A | 2/1988 | Mann | |
| 4,871,895 A | 10/1989 | Preston | |
| 5,132,513 A | 7/1992 | Ingwersen et al. | |
| 5,595,671 A * | 1/1997 | David | B23K 9/133 |
| | | | 219/137.62 |
| 6,041,972 A * | 3/2000 | Maayeh | B05C 17/0053 |
| | | | 219/247 |
| 7,196,284 B2 | 3/2007 | Barten | |
| 2007/0284353 A1* | 12/2007 | Laymon | B23K 9/293 |
| | | | 219/137.31 |
| 2010/0096374 A1* | 4/2010 | Karpoff | B23K 9/29 |
| | | | 219/137.31 |
| 2010/0102037 A1* | 4/2010 | Kettunen | B23K 9/32 |
| | | | 219/74 |
| 2012/0248085 A1 | 10/2012 | Jansma | |
| 2014/0083990 A1 | 3/2014 | Kettunen | |
| 2015/0306695 A1* | 10/2015 | Oberndorfer | B23K 9/295 |
| | | | 219/137.63 |
| 2018/0229326 A1* | 8/2018 | Gagnon | B23K 9/287 |

OTHER PUBLICATIONS

International Search Report and Written Opinion dated Sep. 30, 2016 from corresponding Application No. PCT/CA2016/050931, 13 pages.

International Preliminary Report on Patentability dated Nov. 14, 2017 from corresponding Application No. PCT/CA2016/050931, 6 pages.

\* cited by examiner

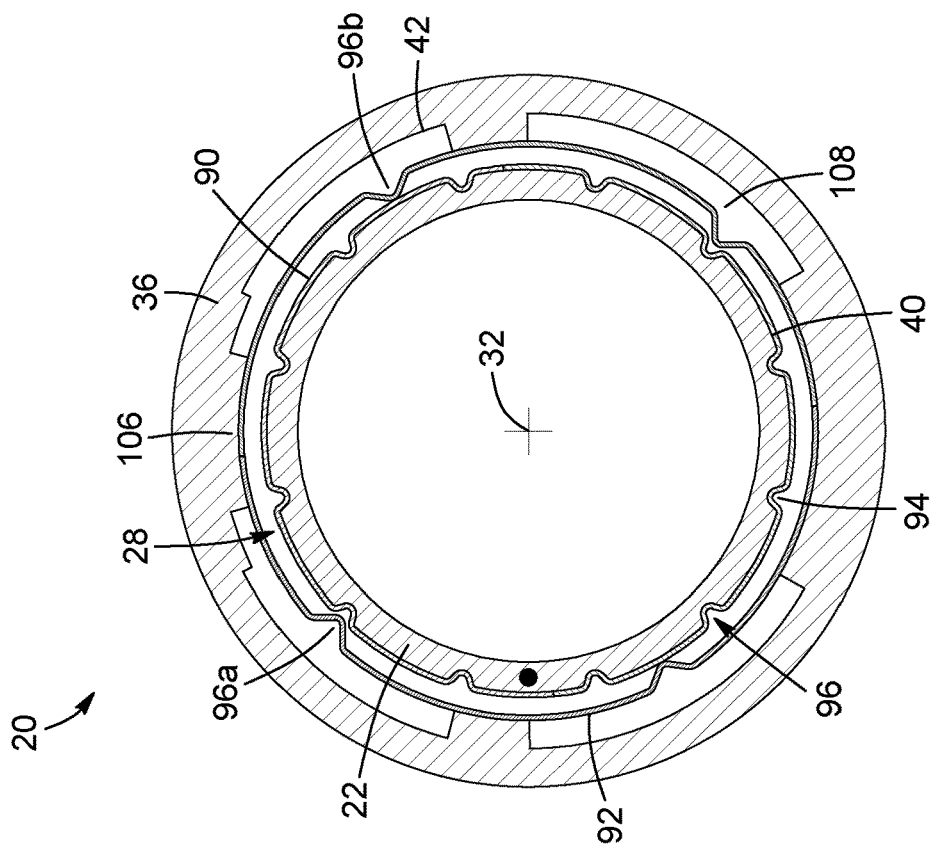
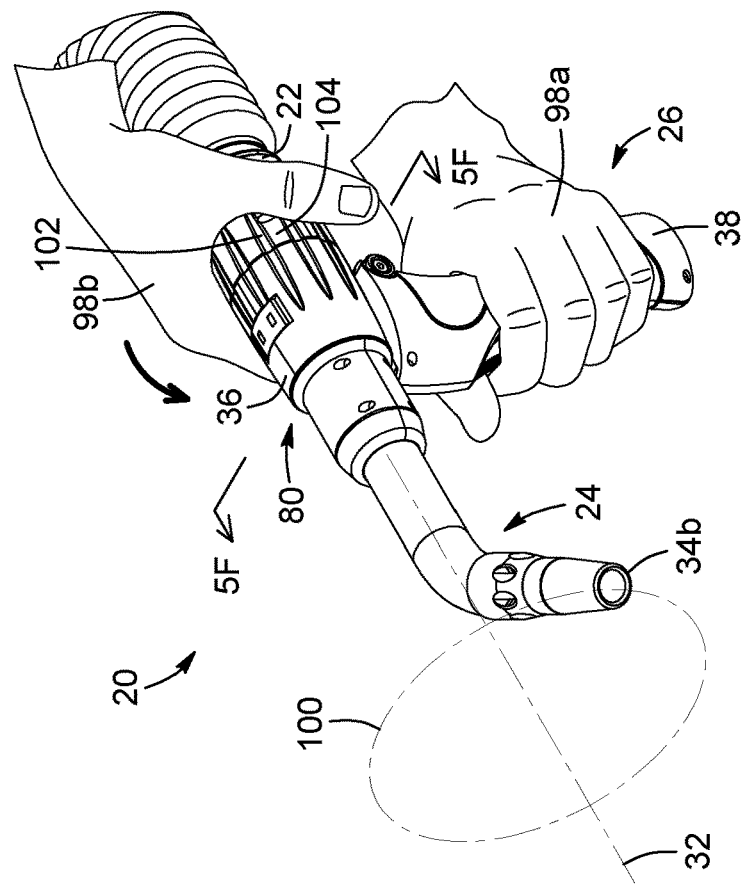
FIG. 5E
FIG. 5F

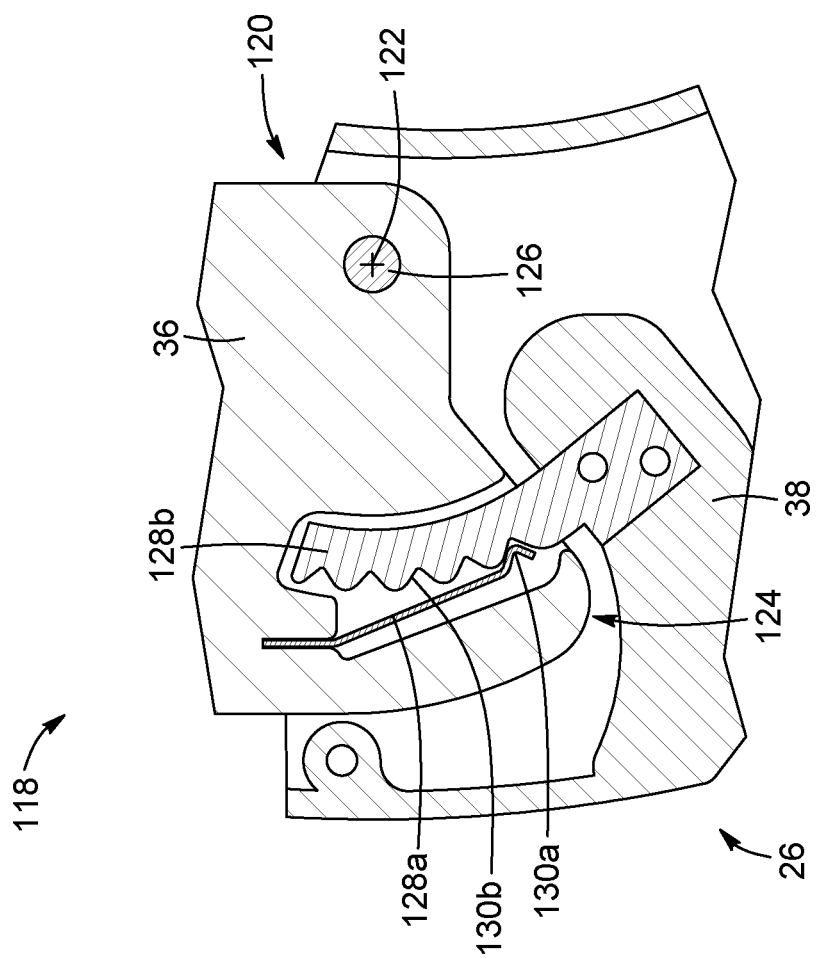
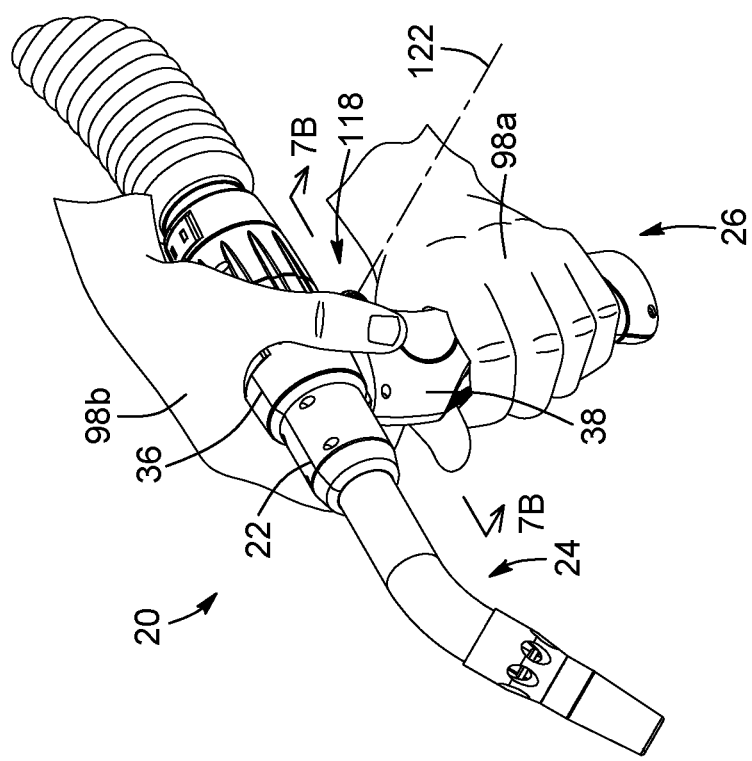
FIG. 7B
FIG. 7A

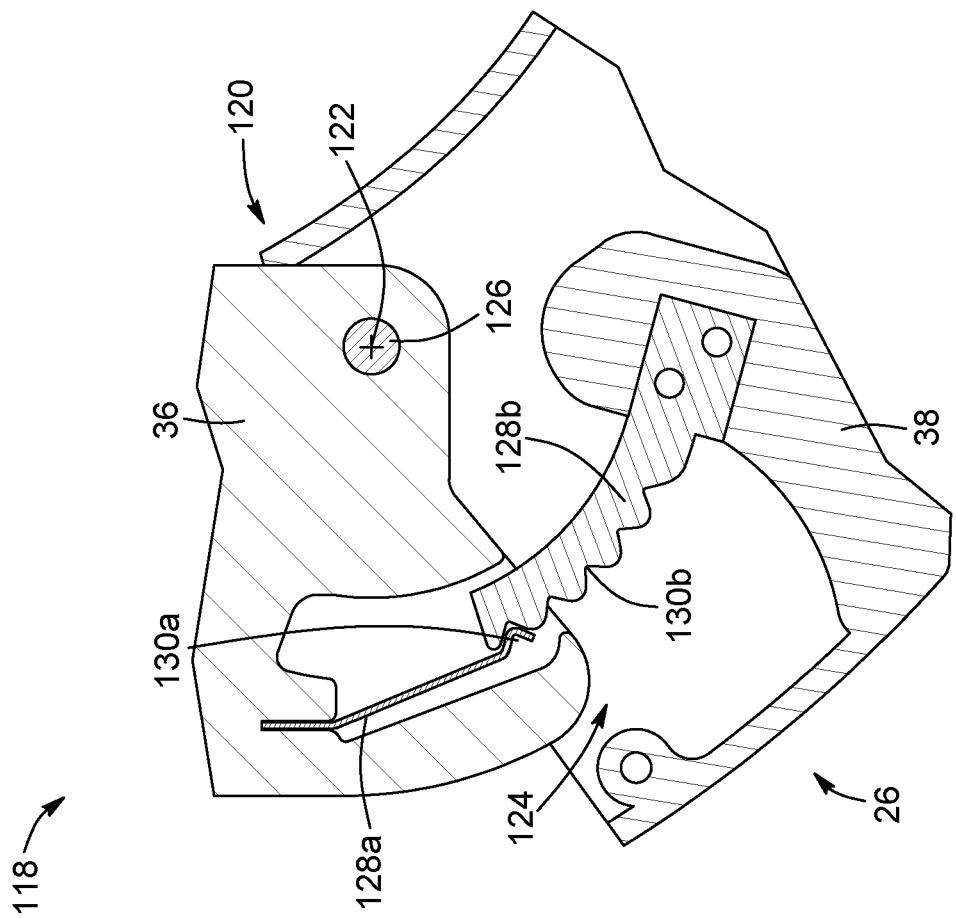
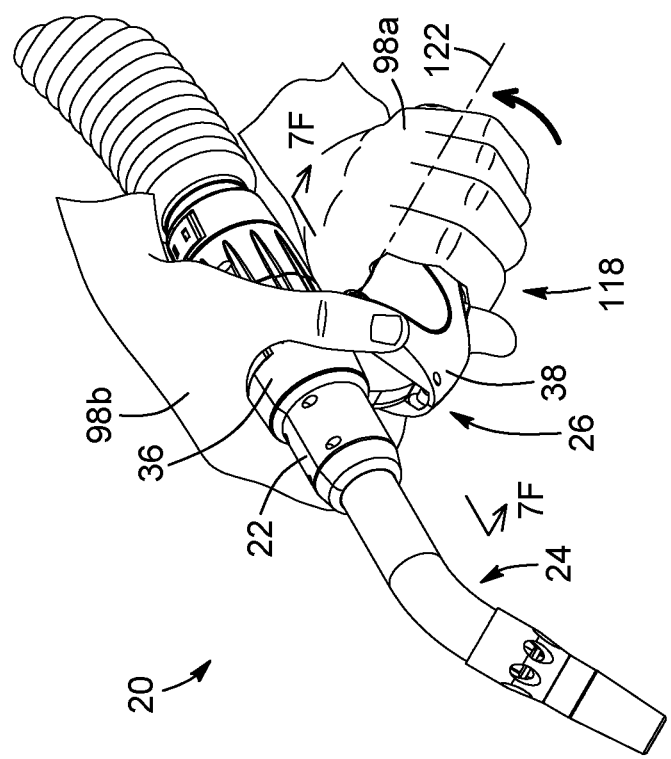
FIG. 7F
FIG. 7E

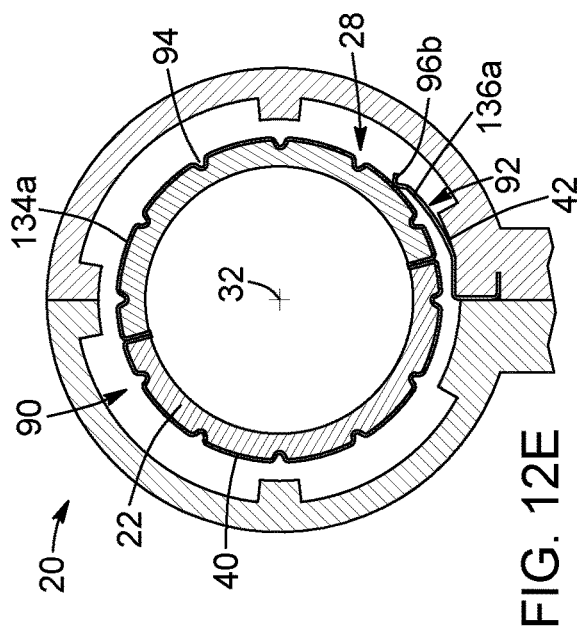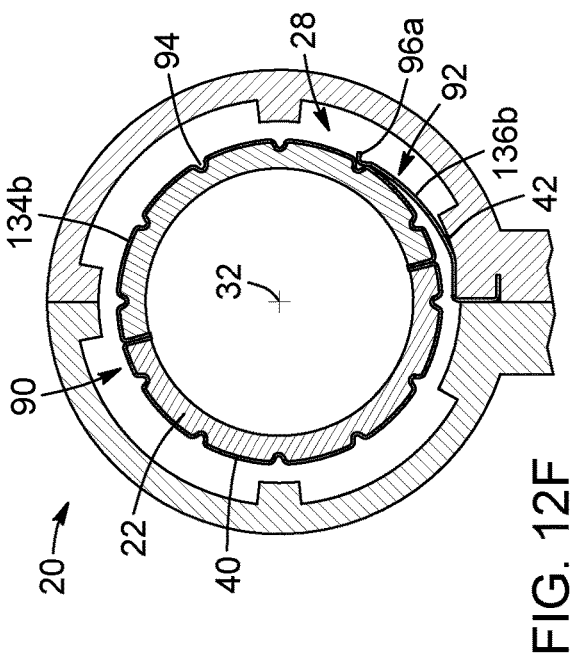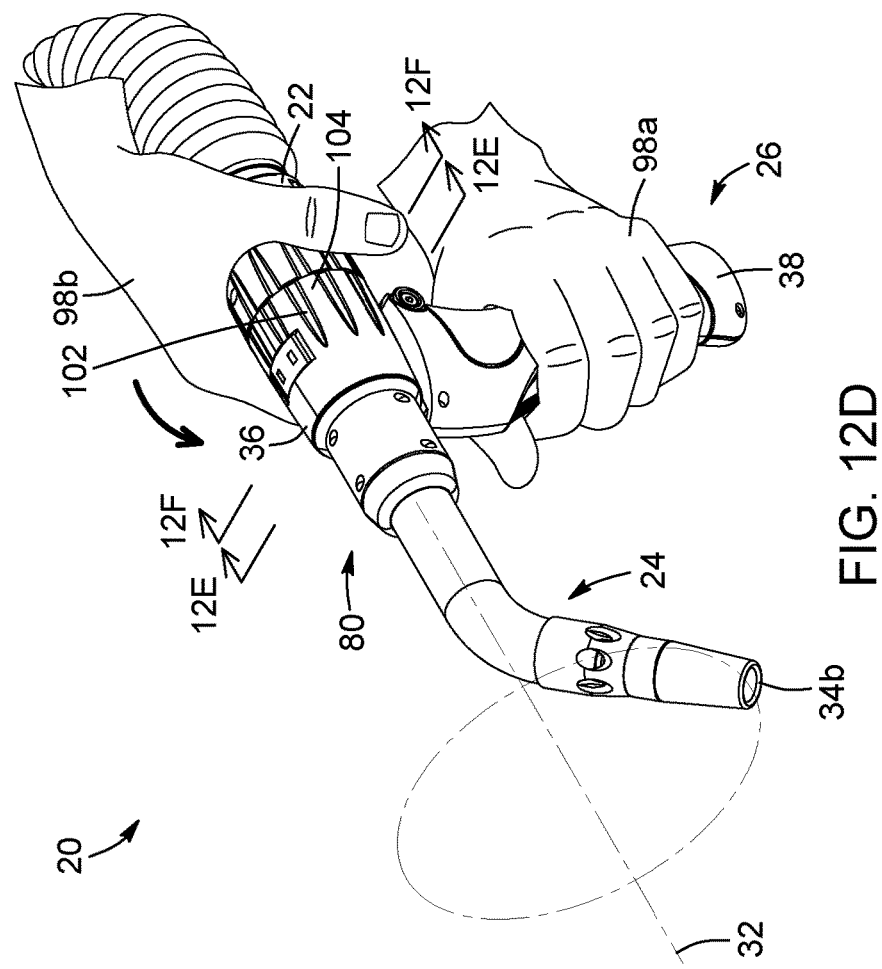

WELDING GUN WITH LOCKABLE ROTATION MECHANISM

TECHNICAL FIELD

The technical field generally relates to welding guns, and more particularly, to a welding gun provided with a lockable rotation mechanism.

BACKGROUND

Arc welding refers to a broad group of welding processes used in many industrial applications and relying on an electric arc as the heat source to join metal parts. Gas metal arc welding (GMAW) is one type of arc welding process in which a continuous and consumable metal electrode wire is used to produce the electric arc and provide filler material into the weld. The electrode wire is melted as it is fed through a handheld tool called a welding gun. In addition to feeding the wire, the welding gun emits a shielding gas that protects the weld area from atmospheric contamination. In a conventional welding operation, the welding gun is coupled to a wire source, a gas source and a power source to respectively supply the electrode wire, the shielding gas and electrical power to the weld area.

Arc welding guns, as well as other types of welding guns, tend to be bulky and not easy to maneuver, especially those which are connected to a fume extraction vacuum system in addition to wire, gas and power sources. Also, arc welding guns are often used for welding in tight, hard-to-access weld areas. As a result, it is known that welders suffer a high prevalence of musculoskeletal physical ailments such as tendonitis, carpal tunnel syndrome, and other hand, wrist, elbow, shoulder and back strain and injuries. To alleviate these problems, some existing welding guns are provided with a rotation mechanism that allows for the welding end of the gun to be positioned at different angular positions with respect to the portion of the welding gun which is held by the user. As a result, the hand holding the gun can be maintained in a comfortable position where muscle strains are reduced.

Although existing rotation mechanisms for arc welding guns may have certain advantages, they also suffer from a number of drawbacks and limitations. For example, such drawbacks and limitations can include: the necessity of disengaging and re-engaging one or more gun components in order to change the orientation of the gun; the inability to conveniently lock and release the gun into specific orientations; and the angle that the handle makes with respect to the main body of the gun.

Accordingly, many challenges remain in the development of welding guns provided with rotation mechanisms that can be used more readily and conveniently than existing devices, while also alleviating at least some of their drawbacks.

SUMMARY

According to an aspect, there is provided a welding gun. The welding gun includes:
- an elongated body having a front end, a rear end, and a longitudinal axis extending between the front end and the rear end;
- a neck assembly having an end connectable to the front end of the elongated body;
- a handle including a sleeve portion mounted coaxially around and in a fixed longitudinal relationship with the elongated body, and a grasping portion extending lengthwise radially outwardly from the sleeve portion; and
- a rotation mechanism operatively connected between an outer periphery of the elongated body and an inner periphery of the sleeve portion for rotating the elongated body and the neck assembly relative to the handle about the longitudinal axis, the rotation mechanism including:
  - an inner component fixedly provided along the outer periphery of the elongated body, the inner component having a number of circumferentially distributed engaging elements; and
  - an outer component fixedly provided along the inner periphery of the sleeve portion, the outer component having a number of circumferentially distributed engaging elements, the engaging elements of the outer component cooperating with the engaging elements of the inner component for releasably locking the elongated body into a plurality of discrete angular positions about the longitudinal axis.

In some implementations, the engaging elements of one of the inner and outer structures include radial projections; and the engaging elements of the other one of the inner and outer structures include radial recesses for receiving therein the radial projections.

In some implementations, the engaging elements of one of the inner and outer structures each include a cavity, a spring-loaded detent inside the cavity and a detent spring coupled between the cavity and the spring-loaded detent; and the engaging elements of the other one of the inner and outer structures include slots for receiving at least partly therein the spring-loaded detents.

In some implementations, the number of engaging elements of the inner structure is different than the number of engaging elements of the outer structure.

In some implementations, the number of engaging elements of the inner structure is greater than the number of engaging elements of the outer structure.

In some implementations, the engaging elements of the inner structure are equally angularly spaced from one another.

In some implementations, at each of the plurality of discrete angular positions of the elongated body relative to the sleeve portion, the engaging elements of the outer structure are divided into:
- one or more aligned engaging elements, each aligned engaging element being circumferentially aligned with one of the engaging elements of the inner structure; and
- one or more offset engaging elements, each offset engaging element being circumferentially located between adjacent ones of the engaging elements of the inner structure.

In some implementations, each offset engaging element is circumferentially located halfway between the adjacent ones of the engaging elements of the inner structure.

In some implementations:
- the inner structure includes a first and a second inner member longitudinally spaced from each other along the longitudinal axis;
- the outer structure includes a first and a second outer member longitudinally spaced from each other along the longitudinal axis; and
- the one or more aligned engaging elements are provided on one of the first and second outer members of the outer structure and the one or more offset engaging elements of the outer structure are provided on the other one of the first and second outer members of the outer structure.

In some implementations, the plurality of discrete angular positions of the elongated body relative to the sleeve portion are separated from one another by an angle ranging between 7.5° and 15°.

In some implementations, the plurality of discrete angular positions of the elongated body relative to the sleeve portion cover an angular span ranging from 30° to 360°.

In some implementations, the welding gun further includes a hinge mechanism including:
- a hinge member having a hinge axis extending perpendicularly to both the longitudinal axis of the elongated body and a length of the grasping portion, the hinge member rotatably connecting the sleeve portion and the grasping portion of the handle to each other about the hinge axis; and
- a locking member including a first locking element fixedly coupled to the sleeve portion and a second locking element fixedly coupled to the grasping portion, the first locking element and the second locking element cooperating with each other for releasably locking the grasping portion into a number of discrete angular positions relative to the sleeve portion about the hinge axis.

In some implementations, the first and second locking elements have mutually engageable toothed surfaces.

In some implementations, the first locking element is a flexible locking tooth and the second locking element is a rigid locking arm and has a number of teeth on the toothed surface thereof, the number of teeth on the toothed surface of the second locking element determining the number of discrete angular positions of the grasping portion relative to the sleeve portion about the hinge axis.

In some implementations, the plurality of discrete angular positions of the grasping portion relative to the sleeve portion are separated from each other by an angle ranging between 5° and 15°.

In some implementations, the plurality of discrete angular positions of the grasping portion relative to the sleeve portion cover an angular span ranging from 20° to 60°.

According to another aspect, there is provided an assembly for use in a welding gun. The assembly includes:
- an elongated body having a front end, a rear end, and a longitudinal axis extending between the front end and the rear end;
- a handle including a sleeve portion mounted coaxially around and in a fixed longitudinal relationship with the elongated body, and a grasping portion extending lengthwise radially outwardly from the sleeve portion; and
- a rotation mechanism operatively connected between an outer periphery of the elongated body and an inner periphery of the sleeve portion of the handle for rotating the elongated body relative to the handle about the longitudinal axis, the rotation mechanism including:
    - an inner component fixedly provided along the outer periphery of the elongated body, the inner component having a number of circumferentially distributed engaging elements; and
    - an outer component fixedly provided along the inner periphery of the sleeve portion of the handle, the outer component having a number of circumferentially distributed engaging elements, the engaging elements of the outer component cooperating with the engaging elements of the inner component for releasably locking the elongated body into a plurality of discrete angular positions relative to the sleeve portion about the longitudinal axis.

In some implementations, the assembly further includes a hinge mechanism including:
- a hinge member having a hinge axis extending perpendicularly to both the longitudinal axis of the elongated body and a length of the grasping portion, the hinge member rotatably connecting the sleeve portion and the grasping portion of the handle to each other about the hinge axis; and
- a locking member including a first locking element fixedly coupled to the sleeve portion and a second locking element fixedly coupled to the grasping portion, the first locking element and the second locking element cooperating with each other for releasably locking the grasping portion into a number of discrete angular positions relative to the sleeve portion about the hinge axis.

Other features and advantages of the embodiments of the present invention will be better understood upon reading of exemplary embodiments thereof with reference to the appended drawings.

BRIEF DESCRIPTION OF THE DRAWINGS

FIG. 5E is a perspective view of the welding gun of FIG. 1, in a third operating position.

FIG. 5F is a partial schematic cross-sectional front view taken along section line 5F of FIG. 5E.

FIG. 7A is a perspective view of the welding gun of FIG. 1, in a fourth operating position.

FIG. 7B is a partial schematic cross-sectional side view taken along section line 7B of FIG. 7A.

FIG. 7E is a perspective view of the welding gun of FIG. 1, in a sixth operating position.

FIG. 7F is a partial schematic cross-sectional side view taken along section line 7F of FIG. 7E.

FIG. 12D is a perspective view of the welding gun of FIG. 12A in a second operating position.

FIG. 12E is a partial cross-sectional perspective front view taken along section line 12E of FIG. 12D.

FIG. 12F is a partial cross-sectional perspective front view taken along section line 12F of FIG. 12D.

DETAILED DESCRIPTION

Figure 1:
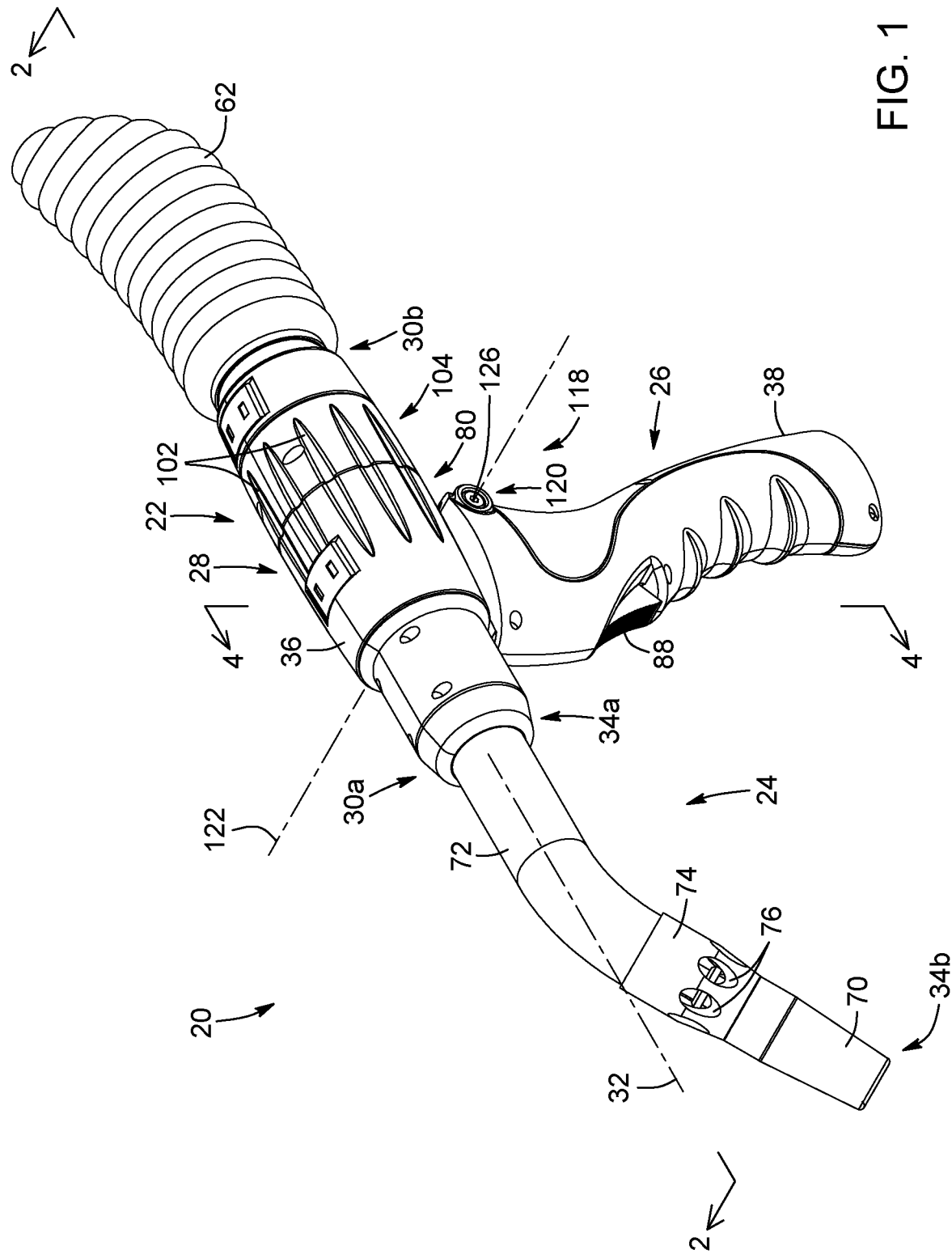
FIG. 1 is a perspective view of a welding gun, in accordance with a first preferred embodiment of the invention.

In the following description, similar features in the drawings have been given similar reference numerals, and, in order to not unduly encumber the figures, some elements may not be indicated on some figures if they were already identified in one or more preceding figures. It should also be understood herein that the elements of the drawings are not necessarily depicted to scale, since emphasis is placed upon clearly illustrating the elements and structures of the present embodiments.

The present description generally relates to a welding gun provided with a lockable rotation mechanism, and to an assembly provided with a lockable rotation mechanism for use in a welding gun. As described below, the lockable rotation mechanism can enable the welding gun body to be selectively rotated about its longitudinal axis and releasably locked at a number of discrete angular positions relative to the gun handle. Three preferred embodiments of the welding gun each having a distinct configuration for the lockable rotation mechanism will be described herein.

Throughout the present description, the term "arc welding" refers to a broad group of welding processes that use an electric arc as the heat source to melt metal parts to be joined at a weld joint. The electric arc is typically created between the metal workpiece to be welded and an electrode, which can be a consumable or a non-consumable electrode. It is to be noted that the term "metal" refers herein not only to metal itself, but also to metallic compounds and alloys. It is to be noted that the techniques described herein are not limited to arc welding but can be applied to other types of welding processes including, for example, oxy-fuel welding.

Many types of arc welding processes exist and are intended to be encompassed within the scope of the techniques described herein. Examples of such arc welding processes include, without limitation, gas metal arc welding (GMAW), gas tungsten arc welding (GTAW), shielded metal arc welding (SMAW), flux-cored arc welding (FCAW), submerged arc welding (SAW), plasma arc welding (PAW), and electro-gas welding (EGW). In particular, GMAW is an arc welding process in which a continuous and consumable metal electrode wire is used to produce the electric arc and provide filler material into the weld, in the presence of a shielding gas or gas mixture whose role is to protect the electrode, electric arc and weld area from atmospheric contamination. Depending on whether the shielding gas or gas mixture is inert or not, GMAW may be referred to as metal inert gas (MIG) or metal active gas (MAG) welding, respectively.

In GMAW, the electrode wire and the shielding gas are typically delivered to the weld through a welding gun. As used herein, the term "welding gun" is intended to encompass various types of handheld or portable welding tools and instruments that can be used for performing welding, such as arc welding, and to which the present techniques can be applied. The terms "handheld" and "portable" refer herein to the fact that the welding gun as described herein can be operated by a user using one or both hands.

Referring to FIGS. 1 to 4, there is shown, according to different views, a first exemplary embodiment of a welding gun 20. In this embodiment, the welding gun 20 is operable for MIG welding, although other embodiments may be operable for other types of welding processes. Broadly described, the welding gun 20 illustrated in FIGS. 1 to 4 includes four main components: an elongated body 22, a neck assembly 24, a handle 26, and a rotation mechanism 28. The elongated body 22 has a front end 30a, a rear end 30b and a longitudinal axis 32 extending therebetween. The neck assembly 24 has a connected end 34a connectable to the front end 30a of the elongated body 22 and a free end 34b. The handle 26 includes a sleeve portion 36 mounted coaxially around and in a fixed longitudinal relationship with the elongated body 22, and a grasping portion 38 extending lengthwise radially outwardly from the sleeve portion 36. The rotation mechanism 28 is operatively connected between an outer periphery 40 of the elongated body 22 and an inner periphery 42 of the sleeve portion 36. The rotation mechanism allows for the elongated body 22 and the neck assembly 24 to be commonly rotated relative to the handle 26 about the longitudinal axis 32.

Figure 10:
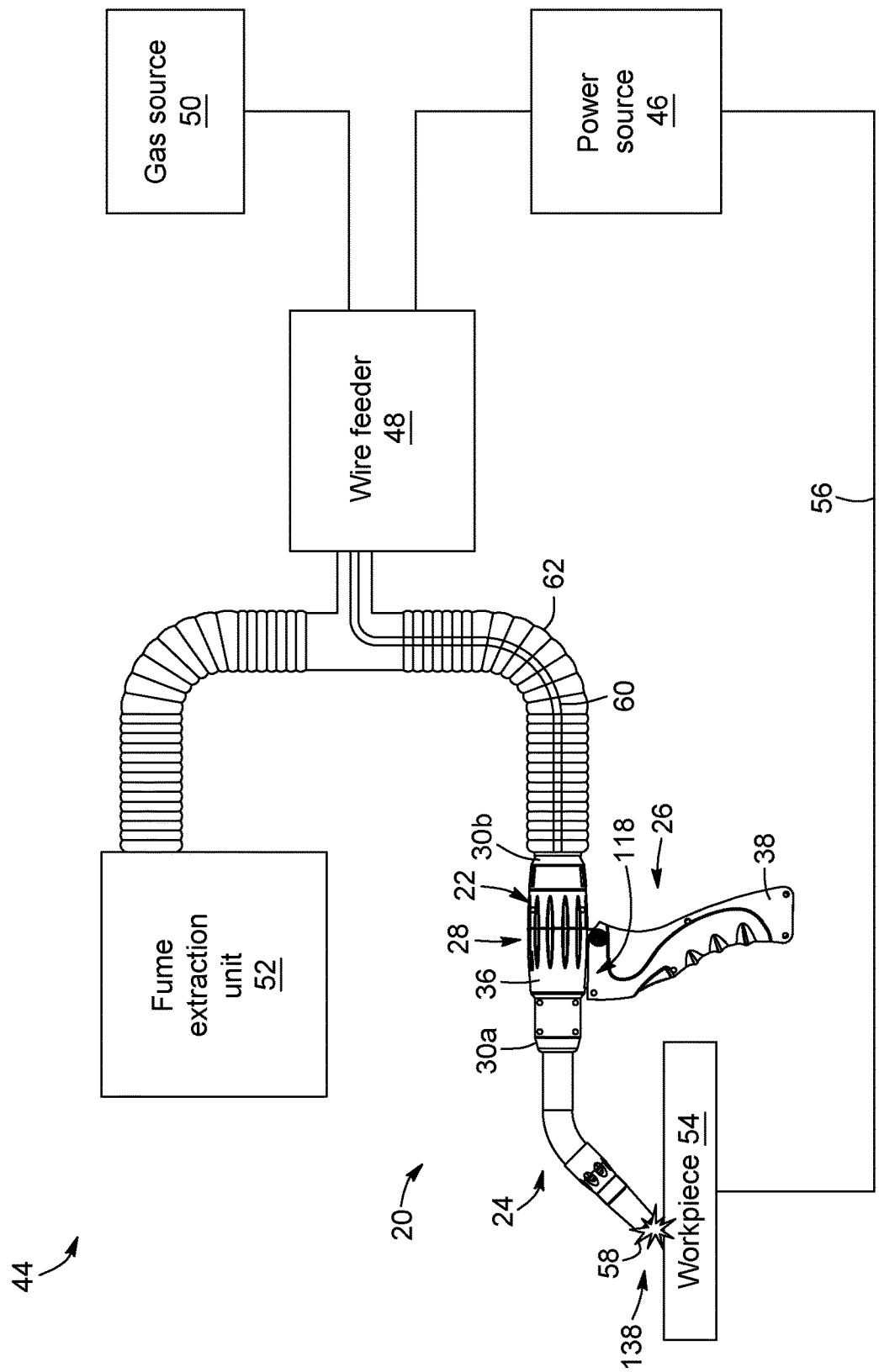
FIG. 10 is a schematic representation of a welding system in which the welding gun according to the present invention can be used.

Turning briefly to FIG. 10, there is illustrated a schematic representation of a welding system 44 in which the welding gun 20 may be operated. The welding system 44 depicted in FIG. 10 includes a power source 46, a wire feeder 48, a gas source 50 and a fume extracting unit 52. The welding system 44 is operable to deliver, via the welding gun 20, electrical power, electrode wire and shielding gas to a workpiece 54 to be welded, and to extract welding fumes from the weld area 138. A ground cable 56 is provided to couple the workpiece 54 to the power source 46 and thus complete a closed electrical circuit when an electric arc 58 is established between the welding gun 20 and the workpiece 54. It is noted that a detailed discussion of welding systems such as that depicted in FIG. 10 will not be provided herein as their structure and operation are well known to those skilled in the art.

As used herein and unless stated otherwise, the terms "connected", "coupled" and variants thereof refer to any connection or coupling, either direct or indirect, between two or more elements. The connection or coupling between the elements may be mechanical, physical, operational, electrical or a combination thereof. More regarding various structural and operational features and components of the welding gun will be described in greater detail below.

Figure 2:
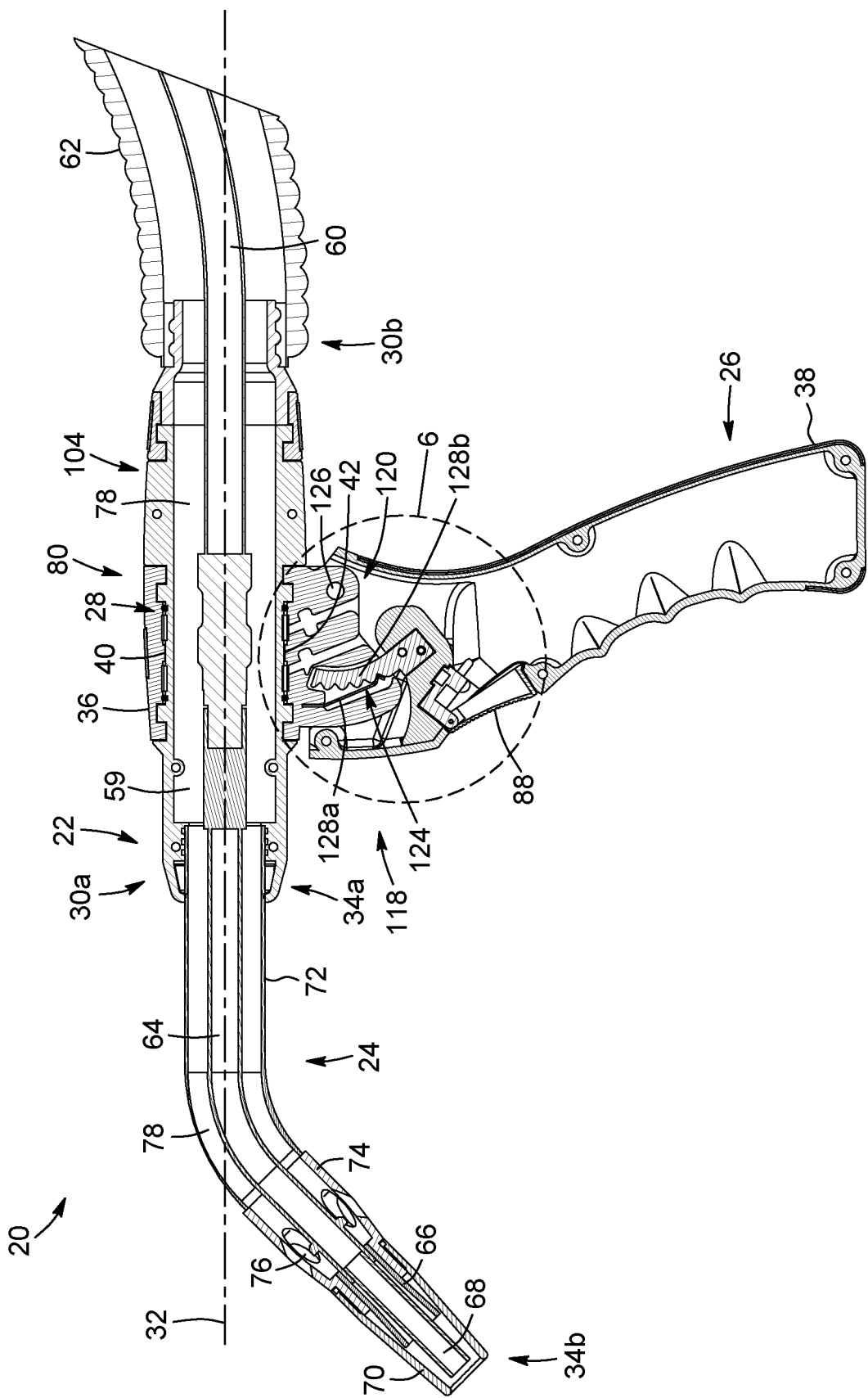
FIG. 2 is a cross-sectional side view of the welding gun of FIG. 1, taken along section line 2.
Figure 3:
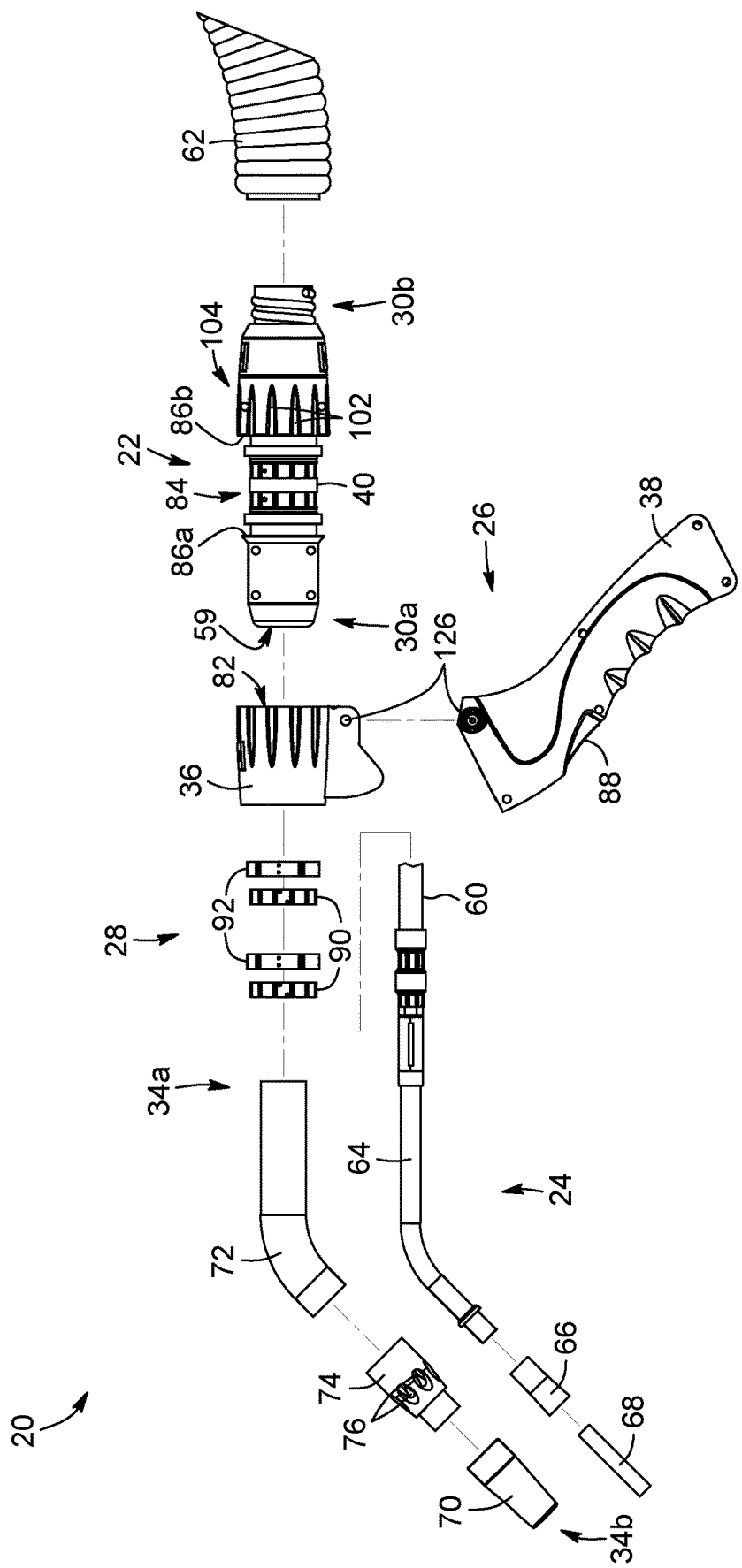
FIG. 3 is an exploded side view of parts of the welding gun of FIG. 1.

Referring to FIGS. 1 to 3, the welding gun 20 includes an elongated body 22 having a front end 30a, a rear end 30b, and a longitudinal axis 32 extending between the front end 30a and the rear end 30b. As used herein, the terms "front", "forward" and variants thereof generally refer to a direction toward the end of the welding gun where the electric arc is established with the workpiece to be welded, and the terms "rear", "rearward" and variants thereof denote the opposite direction.

The elongated body 22 partly defines the overall shape of the welding gun 20 and houses, supports and/or protects several components thereof, as discussed further below. In the illustrated embodiment, the elongated body 22 is embodied as a tubular structure having a longitudinal bore 59 and a generally circular cross-section in a plane transverse to the longitudinal axis 32 (see, e.g., FIG. 4), although other cross-sectional shapes may be used in other embodiments. The elongated body 22 may be made of a heat-resistant, electrically insulating and mechanically strong material, which is capable of withstanding the thermal, mechanical, electrical and other environmental conditions typically encountered during welding operations. In some implementations, the elongated body 22 may be lightweight, compact and ergonomically shaped to facilitate handling and operation thereof.

As illustrated in FIG. 10, the rear end 30b of the elongated body 22 may be connectable to a supply cable 60 and a hose conduit 62. The supply cable 60 connects the welding gun 20 to the power source 46, the wire feeder 48 and the gas source 50 and, thus, routes electrical power, electrode wire and shielding gas to the welding gun 20. The hose conduit 62 can be used to connect the welding gun 20 to the fume extracting unit 52 (e.g., a control vacuum system) operable to provide suction for extracting welding fumes from the weld area 138.

Referring back to FIGS. 1 to 3, in the illustrated embodiment, the hose conduit 62 is embodied by a flexible tube threadedly and hermetically connected to the elongated body 22 at the rear end 30b thereof. In this embodiment, the supply cable 60 extends within the hose conduit 62 and at least partially inside the longitudinal bore 59 of the elongated body 22, whereat it terminates and connects to a gooseneck 64 (see FIG. 2). The gooseneck 64 can have a hollow interior configured to carry the electric power, electrode wire and shielding gas forwardly from the supply cable 60 toward the free end 34b of the neck assembly 24.

Referring still to FIGS. 1 to 3, the neck assembly 24 forms the front-end part of the welding gun 20. The neck assembly 24 includes a connected end 34a connectable to the front end 30a of the elongated body 22 and a free end 34b through which the electrical power, electrode wire and shielding gas can be supplied to the workpiece and welding fumes can be removed from the weld area. The neck assembly 24 is typically curved or bent outwardly away from the longitudinal axis 32 so as to allow for the welding gun 20 to be operated ergonomically in various orientations. In the illustrated embodiment, the neck assembly 24 is non-rotatably and releasably connected to the elongated body 22, for example via a threaded connection.

Alternatively, in another embodiment, the neck assembly may be permanently connected to or integrally formed with the elongated body. In such a scenario, the elongated body may be defined as the portion of the integral structure that extends along the longitudinal axis and to which the handle is connected, whereas the neck assembly may be defined as the portion of the integral structure that is curved, bent or otherwise not strictly aligned with the longitudinal axis and whose free end corresponds to the welding end of the welding gun.

The neck assembly 24 can include a plurality of components including, for example, a gas diffuser 66, a contact tip 68, a nozzle 70, an outer neck 72, and a fume shroud 74. As the structure, function and operation of such components are understood by those skilled in the art, they will only be briefly outlined herein. It will be understood that the configuration of the neck assembly 24 depicted in FIGS. 1 to 3 is provided for illustrative purposes only and can differ in other embodiments.

In the illustrated embodiment, the gas diffuser 66 is connected to the forward end of the gooseneck 64 and receives therefrom the electrode wire and the shielding gas. The gas diffuser 66 can be provided with diffusing holes (not shown) for establishing a flow of shielding gas to the weld area. The gas diffuser 66 can also be used to carry electrical power and the electrode wire to the contact tip 68. The contact tip 68 is the last point of contact between the welding gun 20 and the electrode wire. The contact tip 68 is electrically coupled to the gas diffuser 66 in order to deliver electrical power to the electrode wire. The nozzle 70 surrounds the diffuser 66 and the contact tip 68 and is used to direct the shielding gas exiting the gas diffuser 66 toward the workpiece.

Referring still to FIGS. 1 to 3, the outer neck 72 is connected to the front end 30a of the elongated body 22 and forms a bored structure configured to receive therein the gooseneck 64. In the illustrated embodiment, the outer neck 72 has a curved shape that substantially matches that of the gooseneck 64. The outer neck 72 is also used to prevent the gooseneck 64, which is an electrically live component, from being exposed. The fume shroud 74 is a tubular structure secured between the outer neck 72 and the nozzle 70. The fume shroud 74 is provided with inlet openings 76 defined through its outer periphery. The inlet openings 76 are in fluid communication with the hose conduit 62 via a fume extracting channel 78, and the hose conduit 62 is connected to a fume extracting unit (e.g., a control vacuum system; see FIG. 10) operable to provide suction for extracting welding fumes from the weld area. As better illustrated in FIG. 2, the fume extracting channel 78 is defined by the annular space extending successively through the neck assembly 24, between the inner surface of the outer neck 72 and the outer surface of a portion of the gooseneck 64, and through the longitudinal bore 59 of the elongated body 22, between the inner surface of the elongated body 22 and the outer surface of the remainder of the gooseneck 64 and of part of the supply cable 60. In the illustrated embodiment, weld fumes are captured through the inlet openings 76 of the fume shroud 74 and suctioned through, successively, the fume extracting channel 78 and the hose conduit 62 to a port of the fume extracting unit.

In the embodiment of FIGS. 1 to 3, the handle 26 includes a sleeve portion 36 and a grasping portion 38. As for the elongated body, the handle 26 may be made of a heat-resistant, electrically insulating and mechanically strong material, which is capable of withstanding the thermal, mechanical, electrical and other environmental conditions typically encountered during welding operations.

The sleeve portion 36 is mounted coaxially around a lengthwise coupling section 80 of the elongated body 22. For this purpose, the sleeve portion 36 can have a longitudinal bore 82 extending therethrough in which the elongated body 22 can be received. In the illustrated embodiment, the sleeve portion 36 is approximately centered between the front and the rear ends 30a, 30b of the elongated body 22 and has a length that corresponds to about one third of the length of the elongated body 22. Of course, the positioning and length of the sleeve portion 36 relative to those of the elongated body 22 can be varied in other embodiments.

The sleeve portion 36 is rotatably mounted around the elongated body 22 via the rotation mechanism 28 (described further below) to enable rotation of the elongated body 22 relative to the sleeve portion 36, and thus the handle 26, about the longitudinal axis 32. In particular, the elongated body 22 can be selectively rotated and locked at discrete angular positions relative to the sleeve portion 36 over a certain angular span in a plane perpendicular to the longitudinal axis 32. However, while relative rotational movement between the sleeve portion 36 and the elongated body 22 is enabled around the longitudinal axis 32, no relative axial displacement is permitted along the longitudinal axis 32. In other words, the sleeve portion 36 is mounted in a fixed longitudinal relationship with respect to the elongated body 22.

As used herein, the term "fixed longitudinal relationship" refers to the sleeve portion and the elongated body being coupled to each other in a manner such that no or negligible relative longitudinal movement is permitted therebetween during normal operation of the welding gun. The term "fixed longitudinal relationship" also means that the sleeve portion cannot be readily disengaged or disconnected from the elongated body without disassembling and/or damaging the welding gun. As discussed in greater detail below, this fixed longitudinal relationship means that relative rotation about the longitudinal axis may be achieved between the elongated body and the sleeve portion without the user having to disengage the elongated body and the sleeve portion (and thus the handle) from each other.

For example, in the illustrated embodiment, the outer periphery 40 of the elongated body 22 has a circumferential cradle 84 formed therein along the coupling section 80 (see FIG. 3). The cradle 84 includes a front wall 86a and a rear wall 86b between which the sleeve portion 36 is snuggly received, thus preventing relative movement between the elongated body and the sleeve portion 36 along the longitudinal axis 32. Of course, other embodiments can use different types of techniques to achieve a fixed longitudinal relationship between the sleeve portion and the elongated body and, thus, to prevent relative axial movement and disconnection therebetween.

Figure 5B:
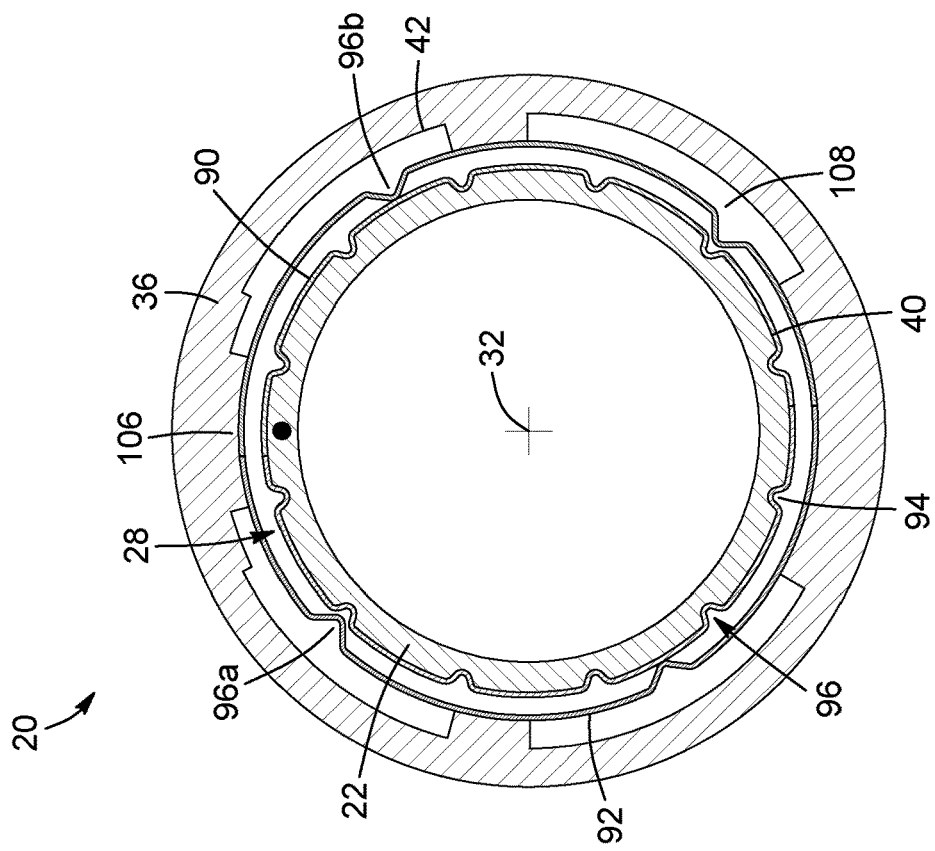
FIG. 5B is a partial schematic cross-sectional front view taken along section line 5B of FIG. 5A.
Figure 5A:
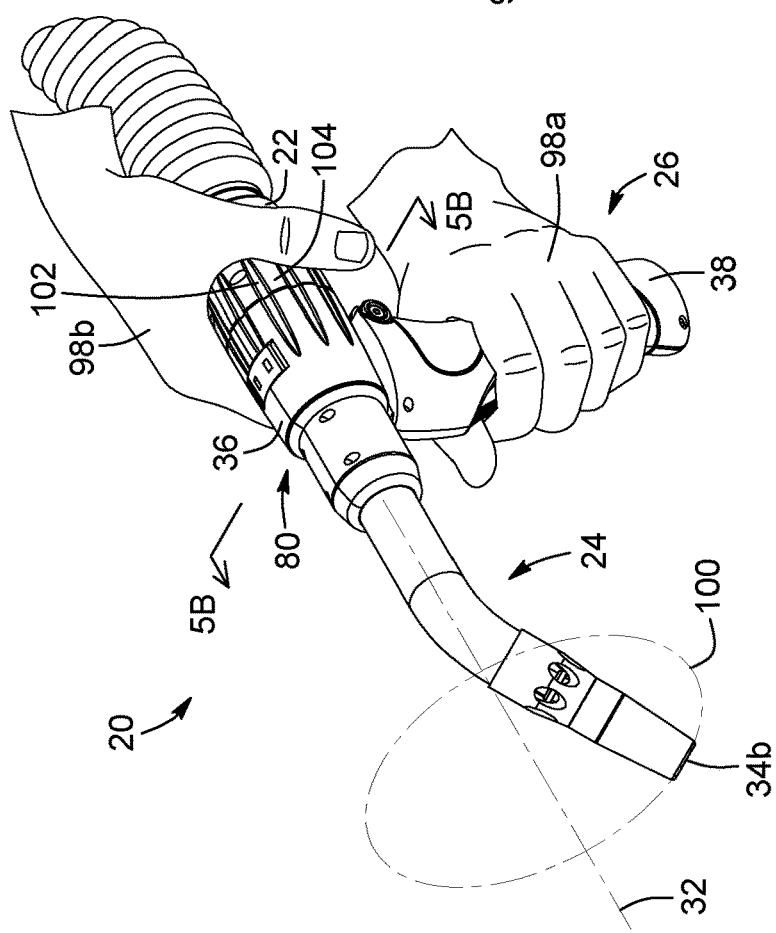
FIG. 5A is a perspective view of the welding gun of FIG. 1, in a first operating position.
Figure 5D:
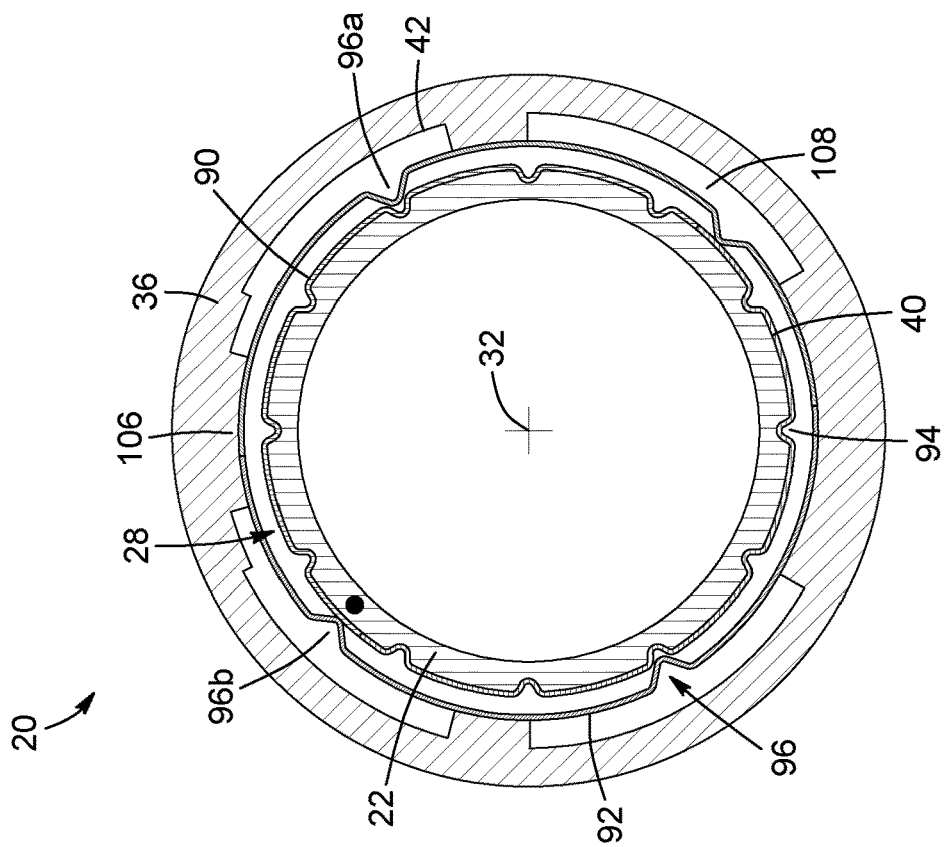
FIG. 5D is a partial schematic cross-sectional front view taken along section line 5D of FIG. 5C.
Figure 5C:
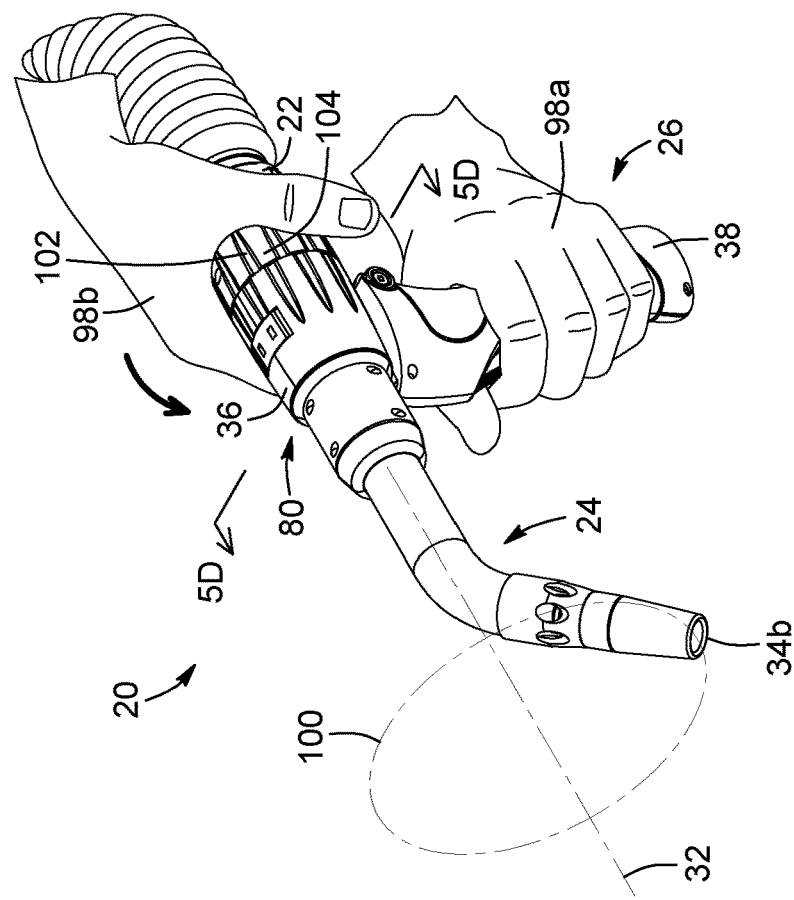
FIG. 5C is a perspective view of the welding gun of FIG. 1, in a second operating position.

The grasping portion 38 is the portion of the handle 26 which is adapted and primarily intended to be grasped, gripped or otherwise held by a hand 98a of a user, as depicted in FIGS. 5A, 5C and 5E. It is noted that the grasping portion 38 may, but need not, be ergonomically shaped to facilitate handling and operation thereof. The grasping portion 38 extends lengthwise radially outwardly from the longitudinal axis 32 and, thus, from the elongated body 22.

Accordingly, as better depicted in FIG. 2, in the illustrated embodiment, the supply cable 60 (and the welding resources carried therein, e.g., the electrical power, electrode wire and shielding gas) and the fume extracting channel 78 both extend lengthwise into the longitudinal bore 59 of the elongated body 22, but bypass or avoid the grasping portion 38 of the handle 26. In other words, the grasping portion 38 of the handle 26 is separated from and not communicating with the longitudinal bore 59 of the elongated body 22, and, thus, not traversed by the supply cable 60 and the fume extracting channel 78.

In this regard, it is known in the art that welding guns can be classified into two types groups according to the arrangement of the handle relative to the welding body: the straight-handle type and the pistol-handle type.

In the straight-handle type, the handle is coaxial or in general alignment with the welding body and, thus, essentially forms a continuation of the welding body. In particular, in a straight-handle welding gun, the welding resources are carried not only along the welding body, but also along the handle, generally within a common longitudinal bore extending continuously along the welding body and the handle. In other words, in straight-handle welding guns, the welding resources are passed axially lengthwise along, successively, the welding body and the handle, which can be formed integrally together.

In the pistol-handle type, the length of the handle extends outwardly and generally downwardly from the longitudinal axis of the welding body, for example at an angle ranging between about 45 degrees (°) and about 90° relative to the welding body. Also, in the pistol-handle type, the welding resources generally do not pass through the portion of the handle that is grasped by the user. It will be understood that embodiments of the welding gun described herein can be designated as being of the pistol-handle type.

While each of the two welding gun types discussed above has certain advantages and drawbacks, existing welding guns of the pistol-handle type are often less favored by welders due to their being generally less comfortable to use and resulting in more strain on the wrist. However, embodiments of the welding gun are provided with a rotation mechanism which, in some implementations, can improve or at least alleviate the drawbacks of existing welding guns of the pistol-handle type while maintaining their advantages in terms of their capability of being held firmly with the hand in a straight and neutral position.

In the illustrated embodiment, the sleeve portion 36 and the grasping portion 38 of the handle 26 are made of distinct components hingedly connected to each other, as described in greater detail below. However, in other implementations, the sleeve portion and the grasping portion need not be hingedly or rotatably connected and, in some of these implementations, the handle may even be provided as a single unitary component. In such case, a sleeve portion and a grasping portion can still be defined, respectively as the portion of the handle which is mounted around the elongated body and the portion which protrudes outwardly away from the elongated body.

In the illustrated embodiment, the welding gun 20 includes a trigger 88 provided on the handle 26 and electrically coupled to the supply cable 60. As known in the art, actuation of the trigger 88 can enable the user to control the supply of electrical power and electrode wire from the power source and wire feeder. The trigger 88 may also enable to control the flow of shielding gas from the gas source. Upon releasing the trigger 88, the supply of electric power, electrode wire and shielding gas to welding gun is ceased.

Figure 4:
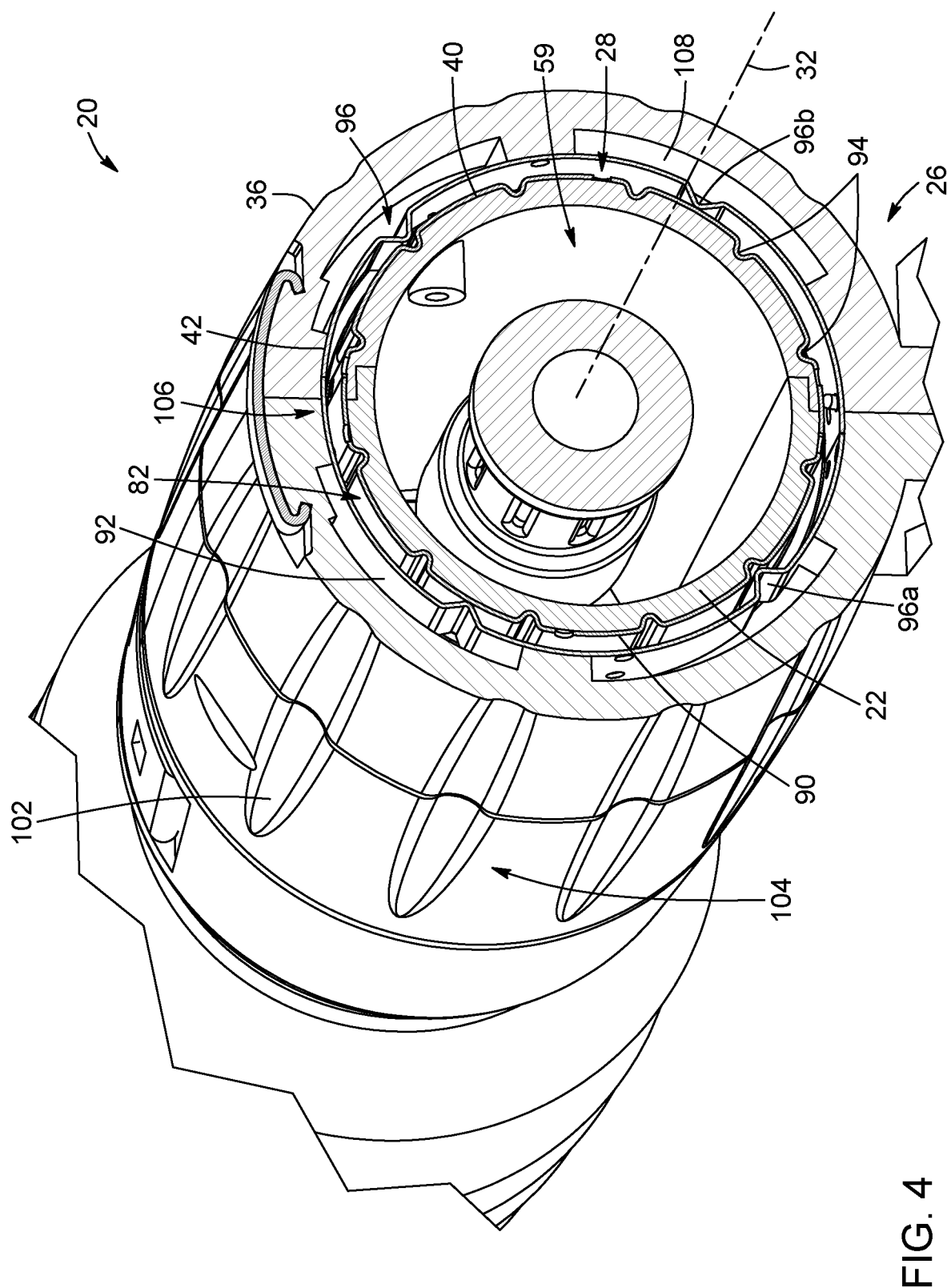
FIG. 4 is a partial cross-sectional perspective front view of the welding gun of FIG. 1, taken along section line 4.

Turning to FIG. 4, which is a partial cross-sectional perspective front view of the welding gun of FIG. 1, the rotation mechanism 28 of the welding gun 20 will be described. The rotation mechanism 28 is operatively connected between the outer periphery 40 of the elongated body 22 and the inner periphery 42 of the sleeve portion 36 for rotating the elongated body 22, and therewith the neck assembly 24 (see FIGS. 5A, 5C and 5E), relative to the handle 26 about the longitudinal axis 32.

As used herein, the term "rotation mechanism" is intended to denote any coupling mechanism that connects between the outer periphery of the elongated body and the inner periphery of the sleeve portion in a manner that allows the elongated body and the sleeve portion to rotate relative to each other about the longitudinal axis of the elongated body.

The rotation mechanism 28 generally includes an inner structure 90 and an outer structure 92. The inner structure 90 is fixedly provided along the outer periphery 40 of the elongated body 22 and has a number of circumferentially distributed engaging elements 94. Similarly, the outer structure 92 is fixedly provided along the inner periphery 42 of the sleeve portion 36 and also has a number of circumferentially distributed engaging elements 96. It to be noted that the inner structure 90 may, but need not, extend along the entire outer periphery 40 of the elongated body 22. Likewise, the outer structure 92 may, but need not, extend the entire inner periphery 42 of the sleeve portion 36. By way of example, in the embodiment described below with reference to FIGS. 12A to 12G, the outer structure 92 is made of two longitudinally spaced members, each of which extending along a limited portion, or arc, of the inner periphery 42 of the sleeve portion 36.

As used herein, the term "fixedly provided" denotes that the inner structure of the rotation mechanism is fixed relative to and rotatable with the elongated body, and that the outer structure of the rotation mechanism is fixed relative to and rotatable with the sleeve portion of the handle. It is to be noted that the use of the term "provided" rather than a term such as "mounted" is intended to reflect the fact that while in some implementations the inner and outer structures may be distinct structural elements mounted, bonded or otherwise connected to the elongated body and the sleeve portion, in other implementations, the inner and/or outer structures may instead be formed, patterned or otherwise defined in the outer periphery of the elongated body and/or in the inner periphery of the sleeve portion.

As will be discussed further below, the engaging elements 96 of the outer structure 92 cooperate with the engaging elements 94 of the inner structure 90, and vice versa, for releasably locking the elongated body 22 into a plurality of discrete angular positions relative to the sleeve portion 36 about the longitudinal axis 32. It will be understood that while the present description refers to releasably locking the elongated body 22 relative to the sleeve portion 36, the operation of the rotation mechanism 28 can also be interpreted as releasably locking the sleeve portion 36 relative to the elongated body 22.

In some embodiments, the plurality of discrete angular positions about the longitudinal axis can be separated from each other by an angle ranging between 7.5° and 15° and cover an angular span ranging from 30° to 360°. For example, in FIG. 4, the rotation mechanism 28 includes 24 discrete angular positions, separated from one another by an angle of 15° and thus covering an angular span of 360°. Of course, these values are provided for illustration purposes only and may differ in other embodiments. In some embodiments, in order to facilitate the operation of the rotation mechanism, it may be advantageous, for example in terms of stability, that the inner and the outer structures be provided as two concentric and coaxial ring-like or annular structures extending over 360° along the circumference of the elongated body and the sleeve portion, respectively.

Of course, these values for the separation between and span covered by the angular positions can differ in other embodiments. Also, depending on the intended application, the angular positions can be evenly or unevenly spaced.

As used herein, the term "releasably locking" and variants thereof refer to a mechanical engagement between the engaging elements of the inner and outer structures which can not only retain the elongated body into any of the plurality of discrete angular positions without inadvertent or undesired release during normal operation of the welding gun, but also allow for this angular position to be changed upon deliberate actuation by or motion of the user, for example by applying a circumferentially directed force to the elongated body and/or the sleeve portion.

For this reason, it is to be noted that the rotation mechanism of the welding gun may, in some instances, be referred to as a "lockable rotation mechanism". It is also to be noted that the terms "lock", "locking", "lockable" and any variants thereof should be interpreted broadly to describe and encompass any manner of retaining the elongated body and the sleeve portion without unintentional release thereof. In particular, those skilled in the art will recognize that an actual lock need not be provided to retain into engagement the elongated body and the sleeve portion.

Furthermore, since the elongated body and the sleeve portion of the handle are fixedly connected to each other along the longitudinal axis, the rotation mechanism according to the present techniques can advantageously be operated readily and conveniently by means of user-exerted force around the longitudinal axis, without having to mechanically, electrically or operatively disconnect or disengage any of the components of the welding gun nor having to actuate a trigger, a button or another input device.

Referring now to FIGS. 5A, 5C and 5E, there are shown perspective views of the welding gun of FIG. 1 in three different operating positions, which correspond to three different orientations of the rotation mechanism 28, as described below with reference to FIGS. 5B, 5D and 5F. FIGS. 5A, 5C and 5E show that in order to operate the rotation mechanism 28, a user can hold the grasping portion 38 of the handle 26 fixedly with one hand 98a while using his or her other hand 98b to rotate and lock the elongated body 22 at a specific angular position relative to the handle 26, and thus orient the neck assembly 24 of the welding gun 20 at a specific orientation with respect to the workpiece to be welded. Indeed, due to the neck assembly 24 being curved, its free end 34b follows a circular path 100 when rotated about the longitudinal axis 32. In the illustrated embodiment, longitudinal ribs 102 are formed on an accessible region 104 (i.e., uncovered by the sleeve portion 36) of the outer periphery 40 of the elongated body 22 to facilitate rotation and locking of the elongated body 22.

In some implementations, the orientation of the welding gun about the longitudinal axis can be changed only between welding operations. Alternatively, in other implementations, the orientation of the welding gun about the longitudinal axis can be changed between, but also during, welding operations. Also, in some implementations, the user can alternatively hold the elongated body fixedly with one hand while using his or her other hand to rotate and lock the handle at a specific angular position relative to the elongated body.

It is an advantage of some implementations of the welding gun that the wrist of the hand holding the handle can be kept in a straight and neutral position regardless of the orientation of the elongated body and neck assembly of the welding. Such a configuration of the welding gun can provide a better weight distribution of the gun with respect to the user's wrist, thus reducing fatigue of the user and the risk of causing physical ailments such as tendonitis. It is also an advantage of some implementations of the welding gun that the configuration of the rotation mechanism does not perturb or interfere with either of the supply cable carrying welding resources and the fume extracting channel.

It will be understood that the rotation mechanism can have various configurations and structures and that its inner and outer structures can be interlocked, interconnected, mated or otherwise engaged with each other according to a variety of techniques. For example, depending on the intended implementation, the number of engaging elements of the inner structure may be different than or equal to the number of engaging elements of the outer structure. Moreover, the engaging elements of each of the inner and outer structures may be equally or unequally angularly spaced from one another.

In the embodiment of FIGS. 1 to 4, each of the inner and outer structures 90, 92 is embodied by one or more thin annular metallic members fixedly clamped, stamped, bonded or otherwise mounted onto the outer periphery 40 of the elongated body 22 and the inner periphery 42 of the sleeve portion 36, respectively. By way of example, in the embodiment of FIGS. 1 to 4, the inner and outer structures 90, 92 include two longitudinally spaced sets of mutually engageable inner and outer annular members (see FIG. 3), although other arrangements may include one or more than two such sets, made of metal or another material. While both the inner and outer structures 90, 92 include metallic members that are annular in shape in FIGS. 1 to 4, in some embodiments, one or both of the inner and outer structures 90, 92 may include non-annular members (see, e.g., FIGS. 12A to 12G described below). Also, while the sets of inner and outer metallic members are identical in FIGS. 1 to 4, they may differ from one another in another embodiment (see, e.g., FIGS. 12A to 12G described below). In this regard, it is worth mentioning that each of the inner and outer structures 90, 92 of the rotation mechanism 28 may be a single integral component, or a combination of separate components.

In some embodiments, the engaging elements 94, 96 of one of the inner and outer structures 90, 92 can include radial projections, while the engaging elements 94, 96 of the other one of the inner and outer structures 90, 92 can include radial recesses for receiving therein the radial projections. By way of example, in FIG. 4, the engaging elements 94 of the inner structure 90 include radial recesses, and the engaging elements 96 of the outer structure 92 include radial projections shaped and configured to interlock with the radial recesses at discrete angular positions around the longitudinal axis 32. Of course, in other embodiments, the opposite configuration may be used where the projections and the recesses are provided on the inner and outer structures, respectively.

In FIG. 4, the outer periphery 40 of the elongated body 22 has radial recesses defined therein. The shape of these radial recesses substantially matches that of the engaging elements 94 of the inner structure 90, such that the entire or most of the inner surface of the inner structure 90 establishes contact with the outer periphery 40 of the elongated body 22. On the contrary, the outer structure 92 is in contact with the inner periphery 42 of the sleeve portion 36 only at discrete spaced-apart contact regions 106 located between the engagement elements 96 and separated from one another by intervening radial indentations 108.

In this configuration, a radial gap determined by the depth of the radial indentations 108 thus exists between the engagement elements 96 of the outer structure 92 and the inner periphery 42 of the sleeve portion 36. The provision of this radial gap allows for the engaging elements 96 of the outer structure 92 to be deflected and pushed slightly into the gap by the inner structure 90 when they are not engaged into one of its engaging elements 94. Accordingly, the inner and outer structures 90, 92 can be locked into engagement at a given angular position and rotated relative to each other between different angular positions. It will be understood that in the illustrated embodiment, the outer structure 92 should be flexible enough to ensure that its engaging elements 96 are sufficiently deflected by the inner structure 90 to not impede the rotation of the elongated body 22 relative to the sleeve portion 36.

In FIG. 4, the number of engaging elements 94 of the inner structure 90 is greater than the number of engaging elements 96 of the outer structure 92. More specifically, the inner structure 90 includes twelve engaging elements 94, while the outer structure 92 includes four spaced engaging elements 96. Of course, in other embodiments, the number of engaging elements of the inner and outer structures may have different values and, in particular, the number of engaging elements in the outer structure may be greater than in the inner structure.

In the illustrated embodiment, the angular separation between adjacent ones of the twelve engaging elements 94 of the inner structure 90 is constant and equal to 30°, while the angular separation between adjacent ones of the four engaging elements 96 of the outer structure 92 alternates between 75° or 105°. For these values of angular separation, it will be understood that at each discrete angular position of the elongated body 22 relative to the sleeve portion 36, the engaging elements 96 of the outer structure 92 can be classified into two groups according to their position relative to the engaging elements 94 of the inner structure 90: (i) a first group including "aligned" engaging elements 96a that are circumferentially aligned and engaged with one of the engaging elements 94 of the inner structure 90; and (ii) a second group including "offset" engaging elements 96b that are circumferentially located between adjacent ones of the engaging elements 94 of the inner structure 90.

It will be understood that, in another embodiment, the opposite configuration may be used where the number of engaging elements in the outer structure are greater than in the inner structure, and where it is the engaging elements of the inner structure that includes both "aligned" and "offset" engaging elements.

Referring still to FIG. 4, the offset engaging elements 96b are circumferentially located halfway between adjacent ones of the engaging elements 94 of the inner structure 90. Consequently, in the illustrated embodiment, the separation between two consecutive angular positions of the elongated body 22 relative to the sleeve portion 36 is equal to 15°, corresponding to half of the separation between two adjacent engaging elements 94 of the inner structure 90. Furthermore, in the illustrated embodiment, the angular range of rotation permitted by the rotation mechanism 28 is equal to 360° divided into twenty-four angular positions separated from one another by 15°.

For example, referring to FIG. 5B, there is shown a schematic cross-sectional front view of the welding gun 20 of FIG. 5A, illustrating a first angular position of the elongated body 22 relative to the sleeve portion 36. Turning now to FIG. 5D, which is a schematic cross-sectional front view of the welding gun 20 of FIG. 5C, the elongated body 22 has been rotated by 45° relative to the sleeve portion 36 compared to the configuration shown in FIG. 5B. Comparing FIGS. 5A and 5B with FIGS. 5C and 5D, it can be seen how the neck assembly 24 of the welding gun 20 can be oriented in a specific operating position by adjusting, via the rotation mechanism 28, the angular position of the elongated body 22 relative to the sleeve portion 36. Finally, referring to FIG. 5F, which is a schematic cross-sectional front view of the welding gun 20 of FIG. 5E, the elongated body 22 has been rotated by another 45° relative to the sleeve portion 36, and is now at 90° with respect to the configuration of FIG. 5B. It is noted that the black dot depicted on the cross-section of the elongated body 22 in FIGS. 5B, 5D and 5F is provided to better illustrate the rotation of the elongated body 22 relative to the sleeve portion 36.

It will be appreciated that the provision of offset engaging elements in one of the inner and outer structures (i.e., the one of the inner and outer structures having the smaller number of engaging elements) can facilitate the release of the aligned engaging elements from the engaging elements of the other one of the inner and outer structures (i.e., the one of the inner and outer structures having the greater number of engaging elements) and, thus, the rotation of the elongated body between different angular positions relative to the sleeve portion about the longitudinal axis. The provision of offset engaging elements in one of the inner and outer structures permits to have more angular positions without increasing the total number of engaging elements in the other one of the inner and outer structures. Of course, depending on the particularities or requirements of a given application, the rotation mechanism of the welding gun may not include such "offset" engaging elements in either one of the inner and outer structures.

Figure 6:
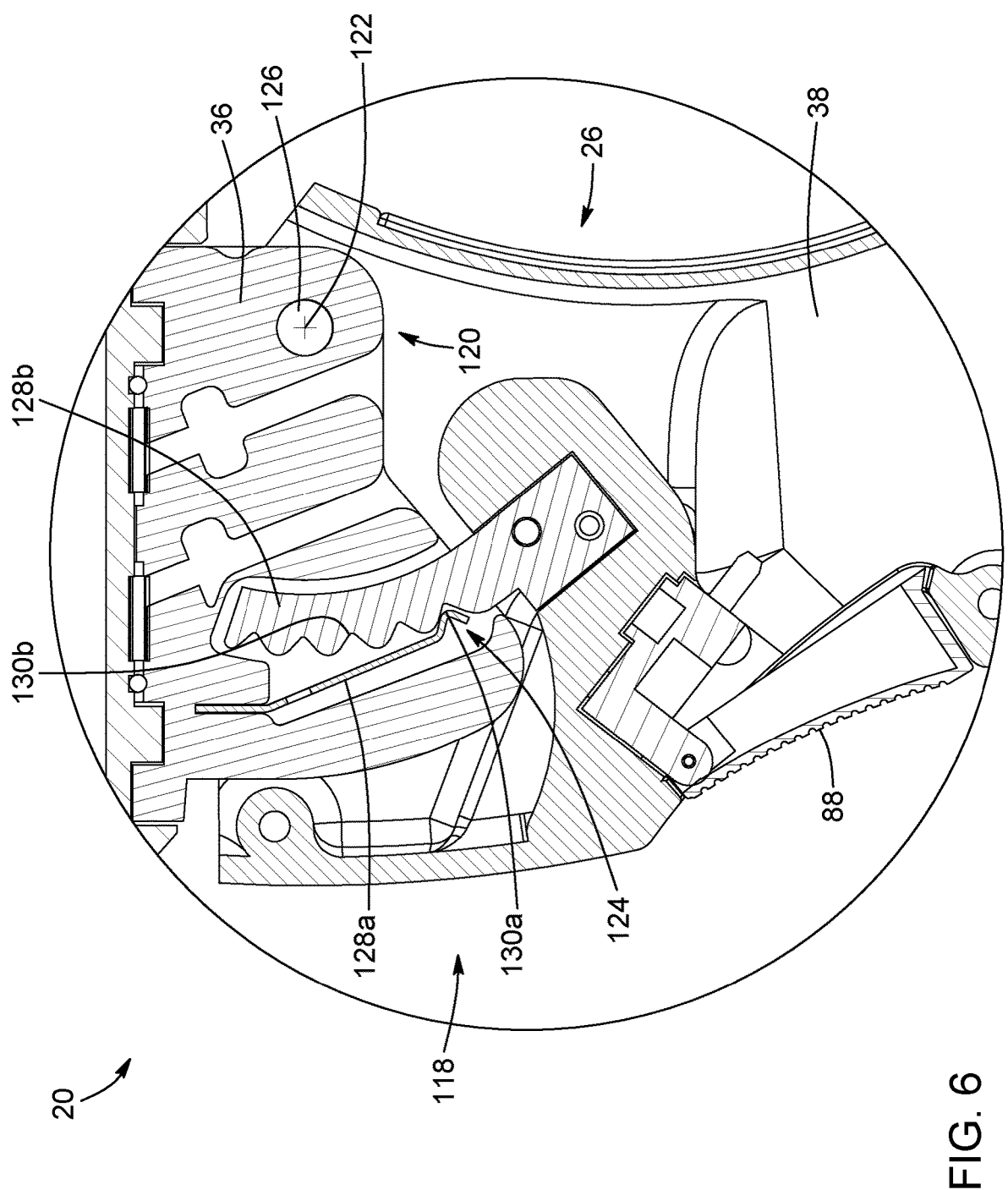
FIG. 6 is an enlargement of portion 6 of FIG. 2.

Turning now to FIG. 6, in some implementations, the welding gun 20 may optionally be provided with a hinge mechanism 118 including a hinge member 120 having a hinge axis 122 and a locking member 124. The hinge mechanism 118 is operatively connected between the sleeve portion 36 and the grasping portion 38 of the handle 26. The hinge mechanism 118 allows for the sleeve portion 36 and the grasping portion 38 to be rotated relative to each other about the hinge axis 122. As better illustrated in FIG. 1, the hinge axis 122 extends perpendicularly to both the longitudinal axis 32 of the elongated body 22 and the length of the grasping portion 38. It should be noted that some embodiments of the welding gun may not include any hinge mechanism.

As used herein, the term "hinge mechanism" refers to any coupling mechanism that connects the sleeve portion and the grasping portion of the handle in a manner that allows them to move in a rotating or pivoting manner toward and away from each other about the hinge axis. In this regard, it will be understood that the terms "hinge", "hinged", "hingedly" and any variants thereof should be interpreted broadly and those skilled in the art will recognize that actual hinges may, but need not, be provided to connect the sleeve portion and grasping portion.

As illustrated in FIG. 6, the hinge member 120 rotatably connects the sleeve portion 36 and the grasping portion 38 of the handle 26 about the hinge axis 122. In this embodiment, the hinge member 120 is embodied by a hinge pin extending along the hinge axis 122 and inserted into respective hinge pin holes 126 formed in the sleeve portion 36 and the grasping portion 38 of the handle 26. Of course, various other types of hinge member may be used in other embodiments to provide rotational coupling between the sleeve portion and the grasping portion of the handle.

In the illustrated embodiment, the locking member 124 including a first locking element 128a fixedly coupled to the sleeve portion 36 and a second locking element 128b fixedly coupled to the grasping portion 38. The first and second locking elements 128, 128b cooperate together for releasably locking the grasping portion 38 into a number of discrete angular positions relative to the sleeve portion 36 about the hinge axis 122. It will be understood that while the present description refers to releasably locking the grasping portion 38 relative to the sleeve portion 36, the operation of the hinge mechanism 118 can also be interpreted as releasably locking the sleeve portion 36 relative to the grasping portion 38.

As mentioned above for the rotation mechanism, when referring to the hinge mechanism, the term "releasably locking" and variants thereof refer to a mechanical engagement between the sleeve portion and the grasping portion of the handle which can not only retain the two portions into any of the plurality of discrete angular positions without inadvertent or undesired release during normal operation of the welding gun, but also allow for this angular position to be changed upon deliberate actuation by or motion of the user, for example by applying a force to either or both of the sleeve and grasping portions. For this reason, it is to be noted that the hinge mechanism of the welding gun may, in some instances, be referred to as a "lockable hinge mechanism".

It is also to be noted that the term "locking member" should be interpreted broadly to describe and encompass any manner of retaining the sleeve and grasping portions into engagement without unintentional release thereof. In particular, those skilled in the art will recognize that the locking member need not be embodied by an actual lock to retain into engagement the sleeve and grasping portions. As for the rotation mechanism, the hinge mechanism according to the present techniques can advantageously be operated readily and conveniently, without having to mechanically, electrically or operatively disconnect or disengage any of the components of the welding gun.

It will be understood that the hinge and locking members of the hinge mechanism can each have various configurations and structures and be based on a variety of techniques.

In the exemplary, non-limiting implementation of the hinge mechanism 118 depicted in FIG. 6, both the first and second locking elements 128a, 128b have mutually engageable toothed or grooved surfaces 130a, 130b. More specifically, in the illustrated embodiment, the first locking element 128a secured to the sleeve portion 36 is a flexible locking tooth, while the second locking element 128b secured to the grasping portion 38 is a rigid locking arm having teeth and grooves on its toothed surface 130b.

The term "flexible" is used herein to denote that the locking tooth is mechanically deflectable, bendable or otherwise deformable in response to an applied load, in particular a force exerted thereon by the user via the rigid locking arm. By contrast, the term "rigid" is used herein to indicate that the locking arm generally retains its shape and does not bend or flex when cooperating with the locking tooth. It is noted that an opposite configuration where the first locking element is rigid and the second locking element is flexible may be used in other embodiments. Furthermore, in yet other embodiments, the first and second locking elements may both be rigid, or both be flexible, or may not be defined in terms of their mechanical flexibility.

In FIG. 6, the number of teeth and grooves on the toothed surface 130b of the second locking element 128b (i.e., the rigid locking arm in the illustrated embodiment) determines the number of discrete angular positions of the grasping portion 38 relative to the sleeve portion 36 about the hinge axis 122. In the illustrated embodiment, the hinge mechanism 118 includes five discrete angular positions, separated from each other by an angle of 9° and thus covering an angular span of 36°. Of course, these values for the number, separation between and span covered by the angular positions relative to the hinge axis can differ depending on the application. For example, in non-limiting embodiments, the plurality of discrete angular positions can be separated from each other by an angle ranging between 5° and 15°, and cover an angular span ranging from 20° to 60°. Also, depending on the intended application, the angular positions can be evenly or unevenly spaced.

Figure 7D:
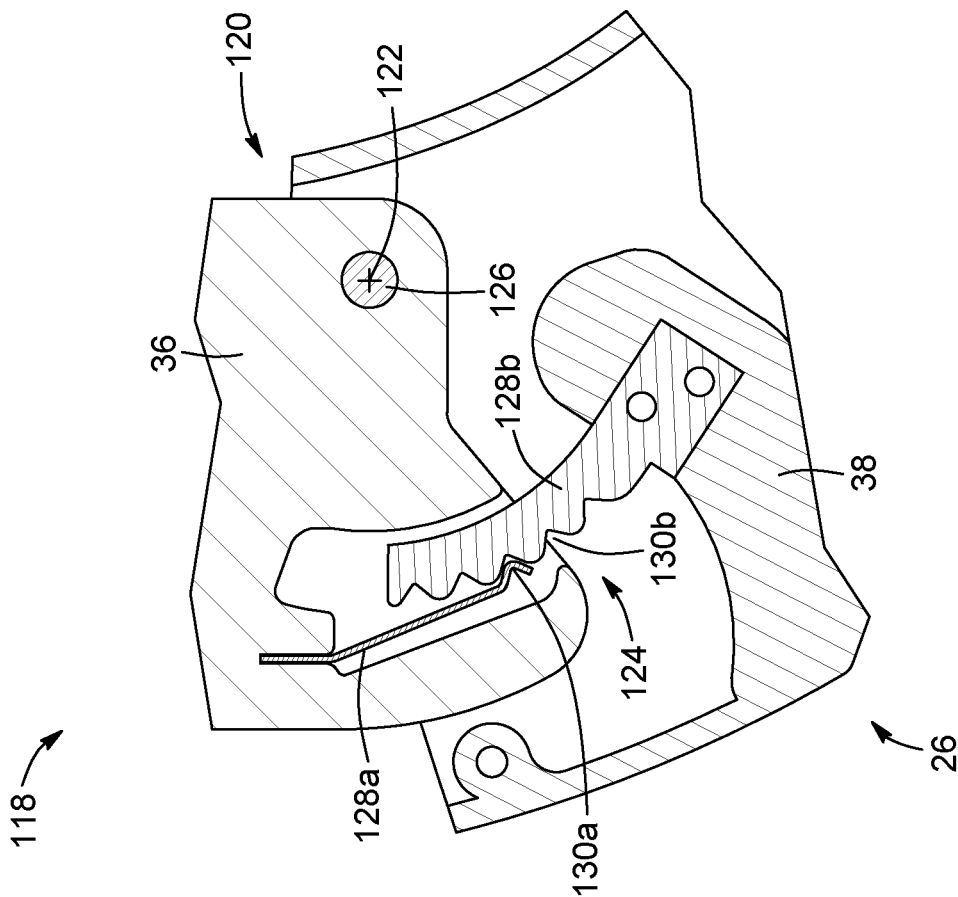
FIG. 7D is a partial schematic cross-sectional side view taken along section line 7D of FIG. 7C.
Figure 7C:
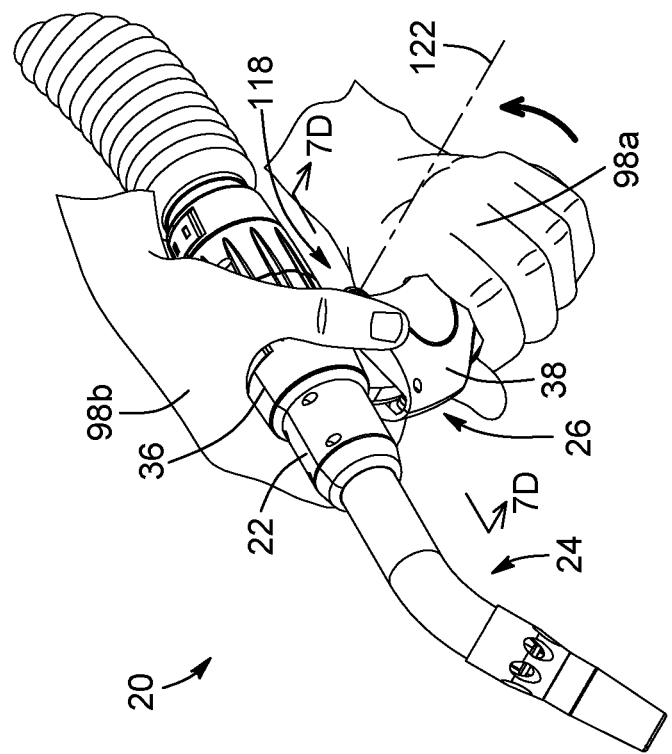
FIG. 7C is a perspective view of the welding gun of FIG. 1, in a fifth operating position.

The operation of the hinge mechanism 118 of FIG. 6 will now be described with reference to FIGS. 7A to 7F. FIGS. 7A, 7C and 7E illustrate perspective views of the welding gun 20 of FIG. 1 depicted in three different operating positions.

Meanwhile, FIGS. 7B, 7D and 7F illustrate the angular positions of the grasping portion 38 relative to the sleeve portion 36 about the hinge axis 122 corresponding to the three operation positions of the welding gun 20 shown in FIGS. 7A, 7C and 7E, respectively.

First, FIGS. 7A, 7C and 7E show that in order to operate the hinge mechanism 118, a user can hold the sleeve portion 36 of the handle 26 fixedly with one hand 98b, while using his or her other hand 98a to pivot the grasping portion 38 about the hinge axis 122 and lock the grasping portion 38 at a specific angular position relative to the sleeve portion 36. More specifically, referring to FIGS. 7B, 7D and 7F, depending on which of the grooves of the second locking element 128b (i.e., the rigid locking arm in the illustrated embodiment) is engaged with the first locking element 128a, the hinge mechanism 118 allows the user to selectively rotate and lock the sleeve portion 36 and the grasping portion 38 of the handle 26 with respect to each other into one of the plurality of discrete angular positions.

It will be understood that, in the illustrated embodiment, switching between different angular positions is made possible, at least partly, by the fact that the locking tooth is flexible and can be deflected by the rigid locking arm upon application of a force by the user in order to disengage from one groove of the locking arm and then re-engage with another groove of the locking arm. Of course, in other implementations, the hinge mechanism can alternatively be operated by holding the grasping portion fixedly with one hand while using his or her other hand to rotate and lock the sleeve portion at a specific angular position relative to the grasping portion.

As for the rotation mechanism, in some implementations, the orientation of the welding gun about the hinge axis can be changed only between welding operations. Alternatively, in other implementations, the orientation of the welding gun about the hinge axis gun can be changed not only between, but also during, welding operations.

It will be understood that the hinge mechanism can have various configurations and structures and that the configuration illustrated in FIG. 6 is provided for exemplary purposes only. In particular, the first and second locking members of the hinge mechanism can be interlocked, interconnected, mated or otherwise engaged with each other according to a variety of techniques. For example, depending on the application, the number of engaging features of the first locking element may be different than or equal to the number of engaging features of the second locking element. Moreover, the engaging features of each of the first and second locking elements may be equally or unequally angularly spaced from one another.

Figure 9:
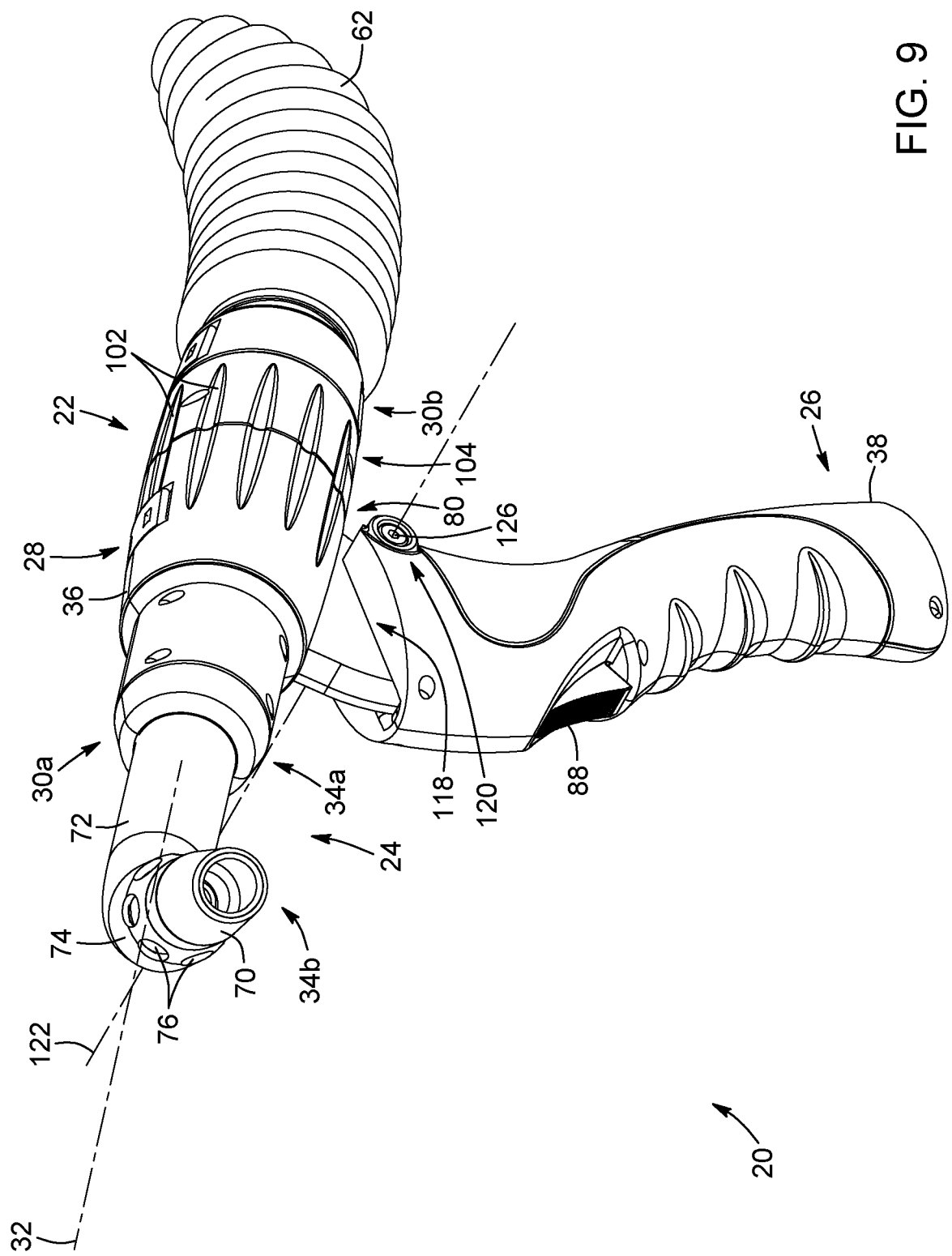
FIG. 9 is a perspective view of the welding gun of FIG. 1, in a different operating position.

Referring now to FIG. 9, there is illustrated the welding gun 20 of FIG. 1, depicted in a different operating position, where the elongated body 22 has been rotated at an angle relative to the handle 26 about the longitudinal axis 32 while the grasping portion 38 of the handle 26 has been rotated relative to the sleeve portion 36 about the hinge axis 122. It is noted that, in some embodiments, the welding gun 20 described herein can allow for the free end 34b of the neck assembly 24 (i.e., the welding end of the gun 20) to be rotated independently along two perpendicular axes relative to the grasping portion 38 of the handle 26.

Accordingly, in such embodiments, by properly adjusting both the rotation mechanism 28 and the hinge mechanism 118, the user can orient the free end 34b of the neck assembly 24 into a plurality of orientations along the longitudinal and hinge axes 32, 122 to suit a particular welding operation (e.g., in accordance with the location and ease of access of the workpiece to be welded), while keeping unchanged the position of the hand holding the grasping portion 38 of the handle 26. It will be understood that the position of the hand holding the grasping portion 38 of the handle 26 is preferably a natural, straight and comfortable position, in which the strain acting on the user's hand and wrist is reduced. For example, in some implementations, it may be desirable that the welding gun 20 be held in such a way as to keep the grasping portion 38 vertical regardless of the angular positions at which of the rotation mechanism 28 and the hinge mechanism 118 are set.

Second Exemplary Embodiment of a Welding Gun

Referring now to FIGS. 11A to 11D, there is shown a second exemplary embodiment of a welding gun 20. The second embodiment of the welding gun 20 is provided with a different configuration for the rotation mechanism 28 than the first embodiment described above.

Figure 11A:
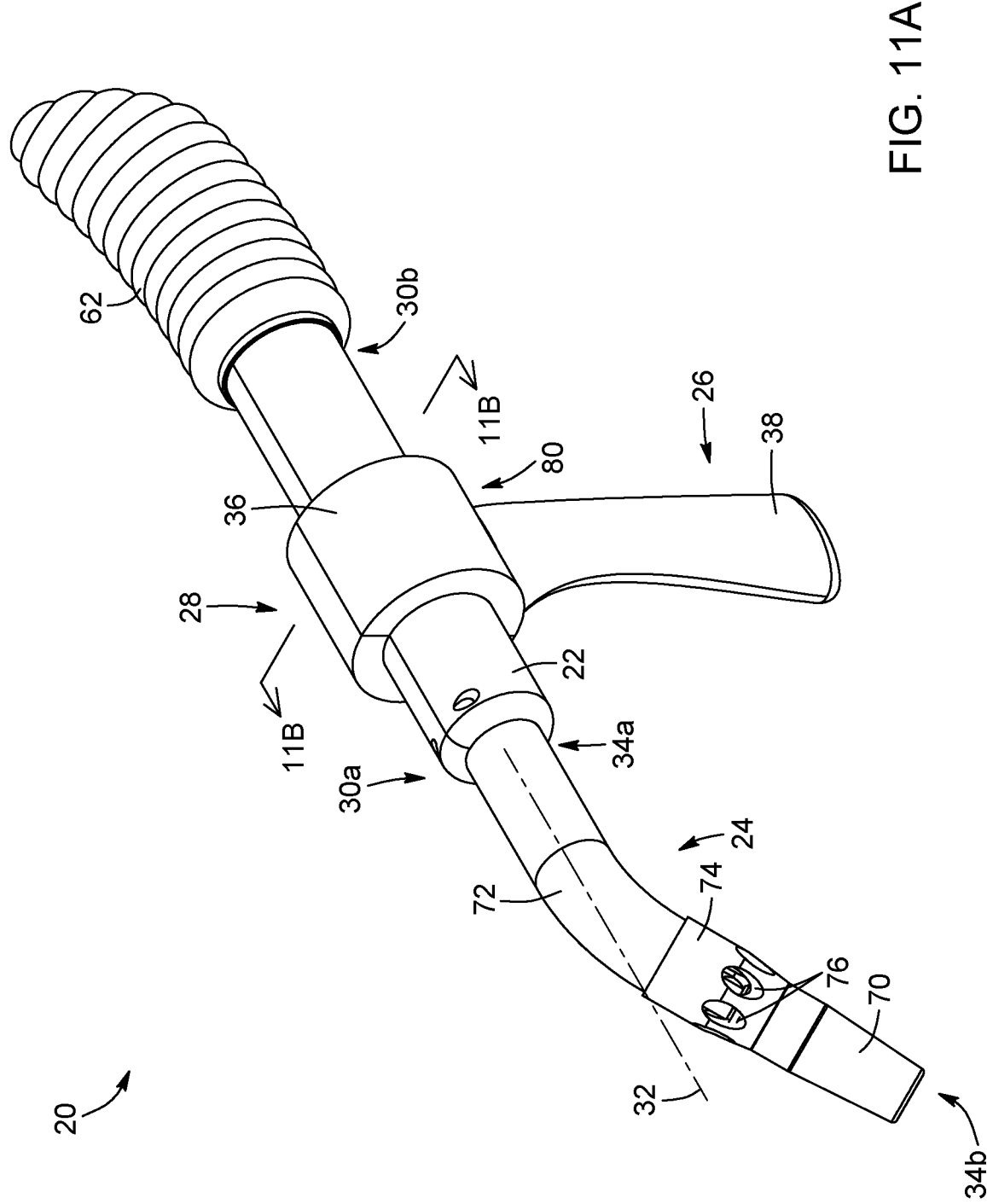
FIG. 11A is a perspective view of a welding gun, in accordance with a second preferred embodiment of the invention, depicted in a first operating position.
Figure 11B:
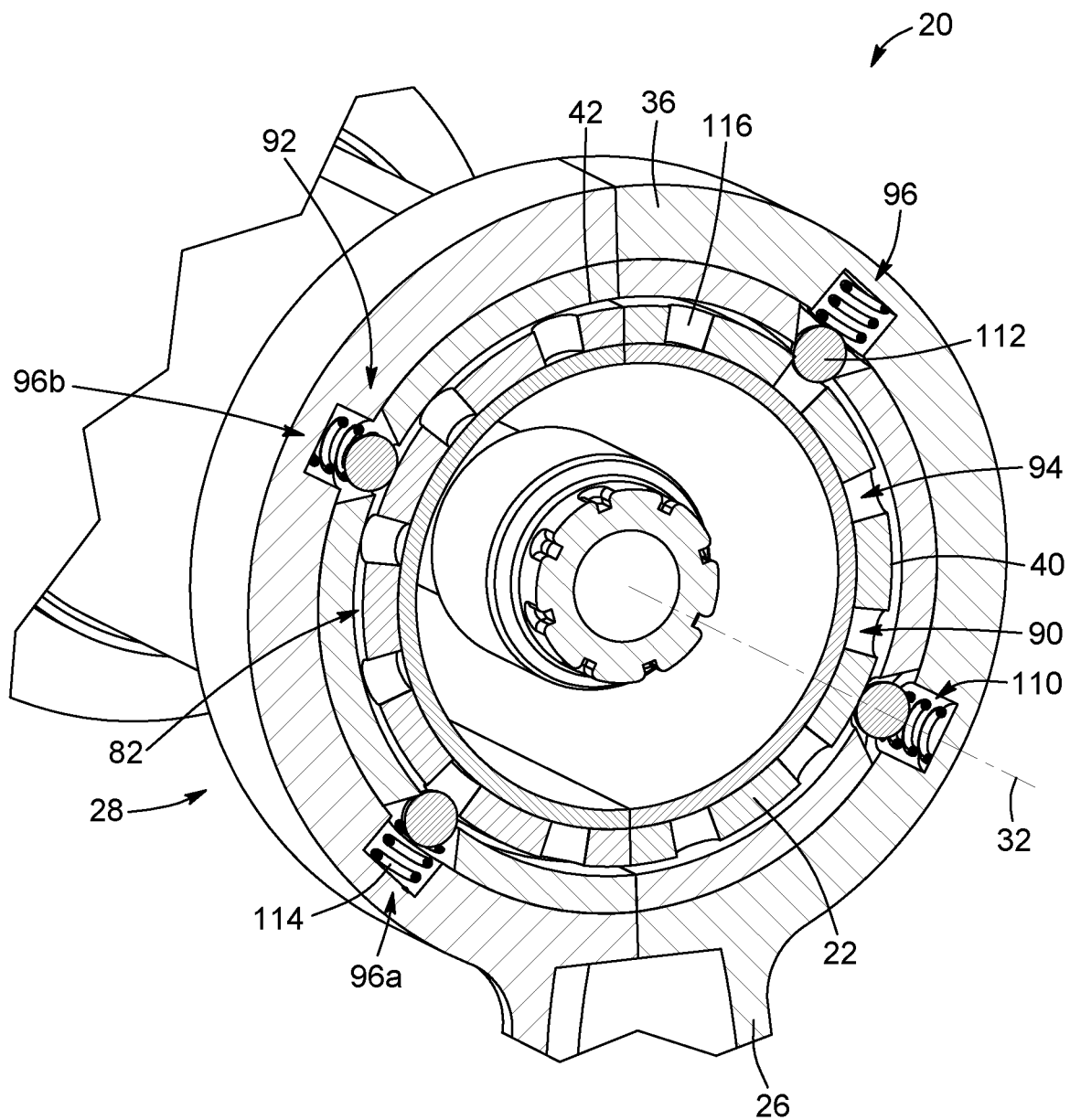
FIG. 11B is a partial cross-sectional perspective front view taken along section line 11B of FIG. 11A.
Figure 11C:
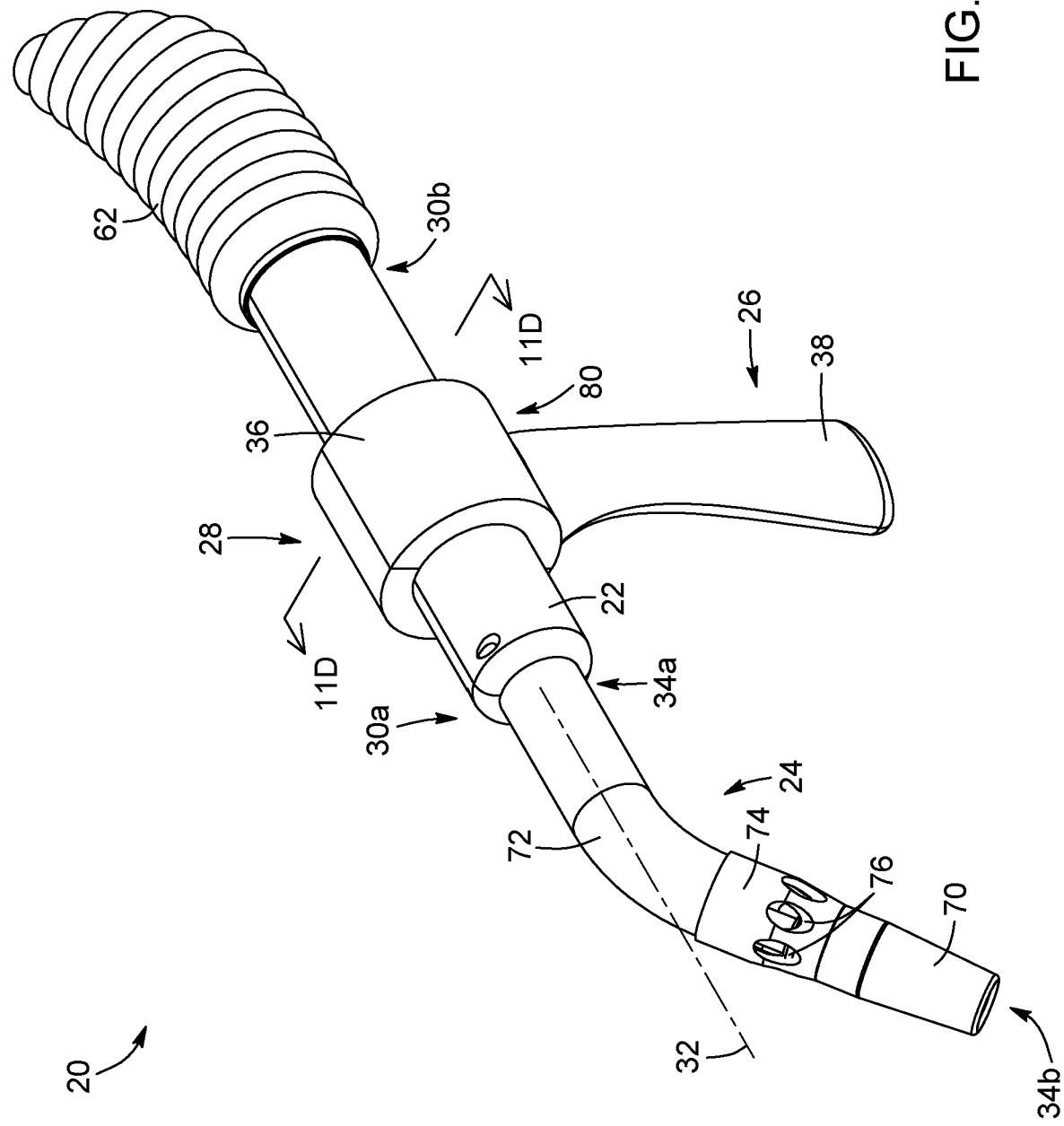
FIG. 11C is a perspective view of the welding gun of FIG. 11A, in a second operation position.
Figure 11D:
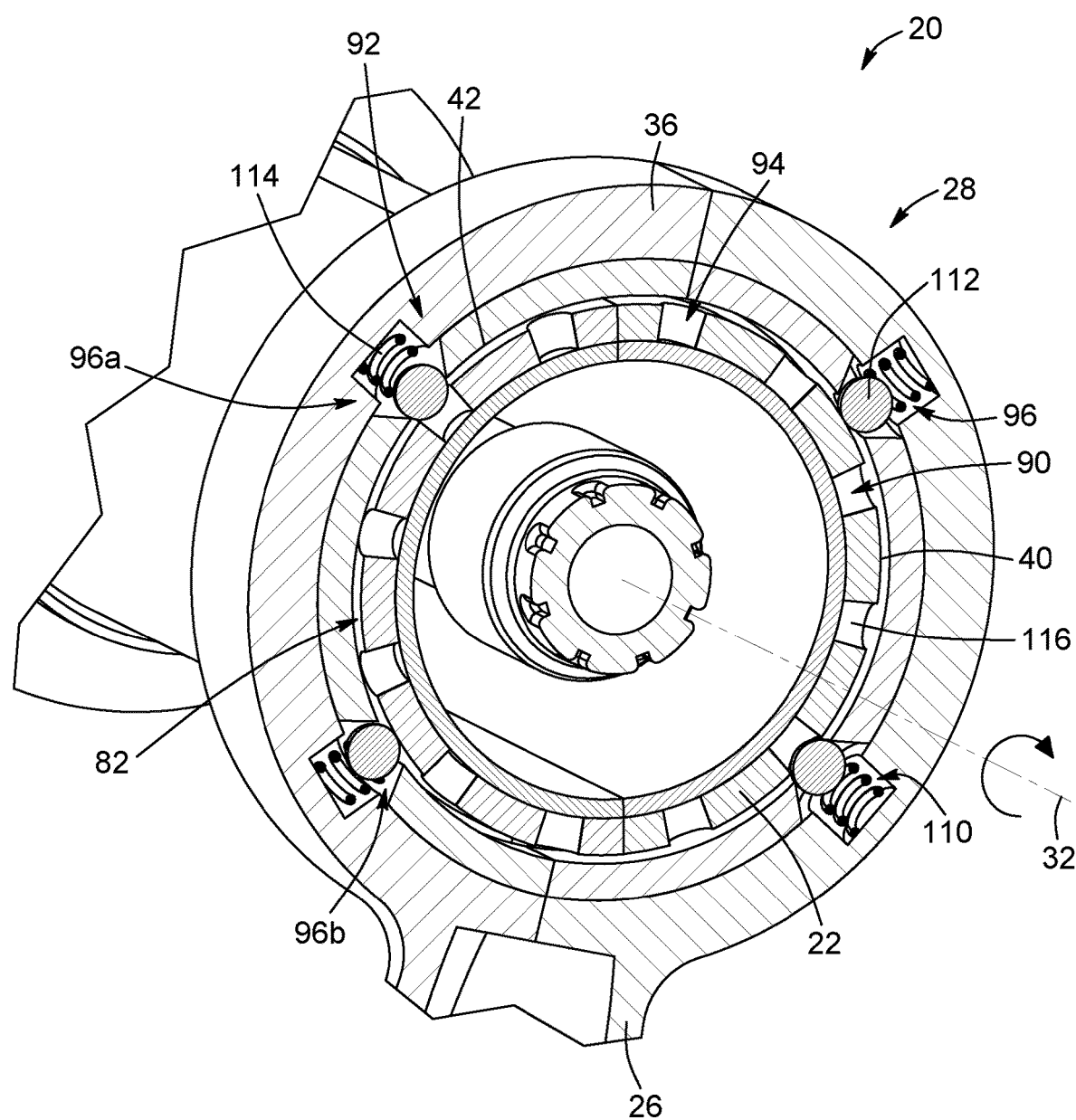
FIG. 11D is a partial cross-sectional perspective front view taken along section line 11D of FIG. 11C.

More specifically, FIGS. 11A and 11C are perspective views of the welding gun 20, depicted in a first and a second operating position, respectively. Meanwhile, FIGS. 11B and 11D illustrate in more detail the rotation mechanism 28 of the second embodiment of the welding gun 20. The rotation mechanism 28 is depicted at two distinct angular positions of the elongated body 22 relative to the sleeve portion 36 of the handle 26, the two angular positions corresponding to the first and second operating positions of the welding gun 20 shown in FIGS. 11A and 11C, respectively.

The features of the second embodiment of the welding gun 20 can be generally similar to like features described for the first embodiment and they will not be described again in detail other than to highlight differences. As for the first embodiment, the welding gun 20 generally includes an elongated body 22, a neck assembly 24, a handle 26 and a rotation mechanism 28, which may share similar features to those described above. The elongated body 22 has a front end 30a, a rear end 30b and a longitudinal axis 32 extending therebetween. The neck assembly 24 has a connected end 34a connectable to the front end 30a of the elongated body 22 and a free end 34b. The handle 26 includes a sleeve portion 36 and a grasping portion 38. The sleeve portion 36 is mounted coaxially and rotatably around the elongated body 22, in a fixed longitudinal relationship therewith. The grasping portion 38 extends along a length thereof radially outwardly from the sleeve portion 36.

The rotation mechanism 28 is operatively connected between an outer periphery 40 of the elongated body 22 and an inner periphery 42 of the sleeve portion 36 and allows for the elongated body 22 and the neck assembly 24 to be commonly rotated relative to the handle 26 about the longitudinal axis 32. It is noted that the embodiment of the welding gun 20 shown in FIGS. 11A to 11D is not provided with a hinge mechanism such as the one described above with reference to FIG. 6. Consequently, in the second preferred embodiment, the welding gun 20 is rotatable only about the longitudinal axis 32 of the elongated body 22.

The exemplary configuration of the rotation mechanism 28 illustrated in FIGS. 11B and 11D shares many features with the rotation mechanism in FIGS. 3, 4, 5B, 5D and 5F. Indeed, it generally includes an inner structure 90 fixedly provided along the outer periphery 40 of the elongated body 22 and an outer structure 92 fixedly provided along the inner periphery 42 of the sleeve portion 36. Also, both the inner and outer structures 90, 92 have a number of circumferentially distributed engaging elements 94, 96. However, instead of radial projections, each of the four engaging elements 96 of the outer structure 92 includes a cavity 110 defined in the inner periphery 42 of the sleeve portion 36, a spring-loaded detent 112, and a detent spring 114 coupled between the spring-loaded detent 112 and the cavity 110. Likewise, instead of radial recesses, the engaging elements 94 of the inner structure 90 include twelve circumferentially distributed slots 116 for receiving at least partly therein the spring-loaded detents 112.

Of course, in other embodiments, the opposite configuration may be used where the engaging elements of the inner structure include spring-loaded detents and detent springs and where the engaging elements of the outer structure include slots. Likewise, in other embodiments, the number of engaging elements of the inner and outer structures may have different values and, in particular, the number of engaging elements in the outer structure may be greater than in the inner structure.

In FIGS. 11B and 11D, the separation between adjacent slots 116 is constant and equal to 30°, while the separation between adjacent cavities 110 alternates between 75° or 105°. The engaging elements 96 of the outer structure 92 thus include, at each discrete angular position of the elongated body 22 about the longitudinal axis 32, both "aligned" engaging elements 96a, which are circumferentially aligned and engaged with one of the slots 116, and "offset" engaging elements 96b, which are circumferentially located halfway between two slots 116. Consequently, the welding gun 20 in FIGS. 11A and 11C can be rotated and locked into any one of twenty-four angular positions about the longitudinal axis 32, the angular positions being separated from one another by 15° and covering an angular span of 360°. Of course, either or both of the angular separation and span can differ in other embodiments.

In FIGS. 11B and 11D, for each aligned engaging element 96a, the detent spring 114 is in a first compressed state and the spring-loaded detent 112 is securely engaged in the slot 116 aligned therewith. By contrast, for each offset engaging element 96b, the detent spring 114 is in a second compressed state as a result of the outwardly directed force applied thereto by a region of the outer periphery 40 of the elongated body 22 located between two slots 116. It will be understood that the detent spring 114 is more compressed in the second compressed state than in the first compressed state.

Referring to FIGS. 11A and 11C, it will be understood that in order to operate the rotation mechanism 28, a user can hold the grasping portion 38 of the handle 26 fixedly with one hand while using the other hand to rotate and lock the elongated body 22 at a specific angular position relative to the handle 26, and thus orient the neck assembly 24 of the welding gun 20 at a specific orientation with respect to the workpiece to be welded. Upon rotation of the elongated body 22 relative to the sleeve portion 36 from the configuration in FIG. 11A to the configuration of FIG. 11C, the spring-loaded detents 112 of the aligned engaging elements 96a in FIG. 11B are gradually pushed out of their respective slots 116 to become offset engaging elements 96b in FIG. 11D. At the same time, each of the offset engaging elements 96b in FIG. 11B is gradually brought into engagement with one of the slots 116 to become an aligned engaging element 96a in FIG. 11D. It will be understood that providing the cavities 110 with inwardly tapered openings 118 can facilitate the engagement and disengagement of the aligned engaging elements 96b into and from the slots 116 and, thus, the operation of the rotation mechanism 28.

Third Exemplary Embodiment of a Welding Gun

Referring now to FIGS. 12A to 12G, there is shown a third exemplary embodiment of a welding gun 20. The third embodiment of the welding gun 20 is provided with a different configuration for the rotation mechanism 28 than the first and second embodiments described above.

Figure 12B:
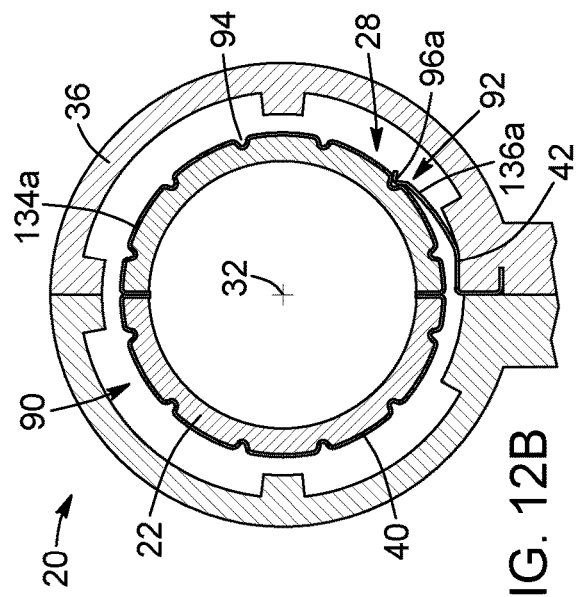
FIG. 12B is a partial cross-sectional perspective front view taken along section line 12B of FIG. 12A.
Figure 12C:
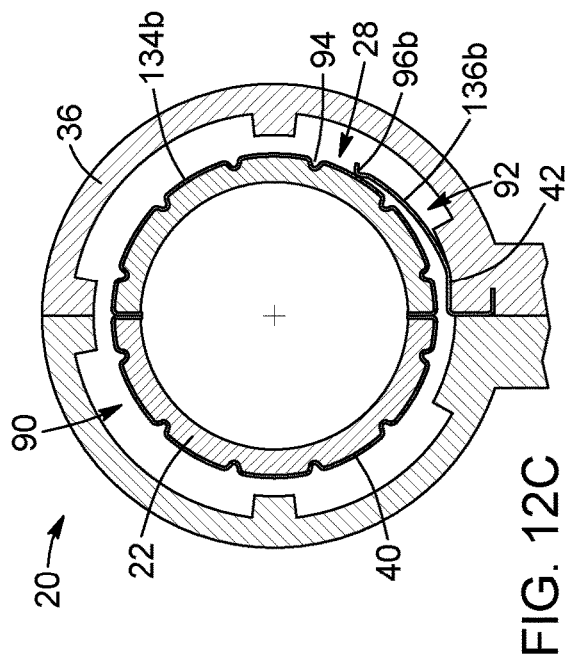
FIG. 12C is a partial cross-sectional perspective front view taken along section line 12C of FIG. 12A.
Figure 12A:
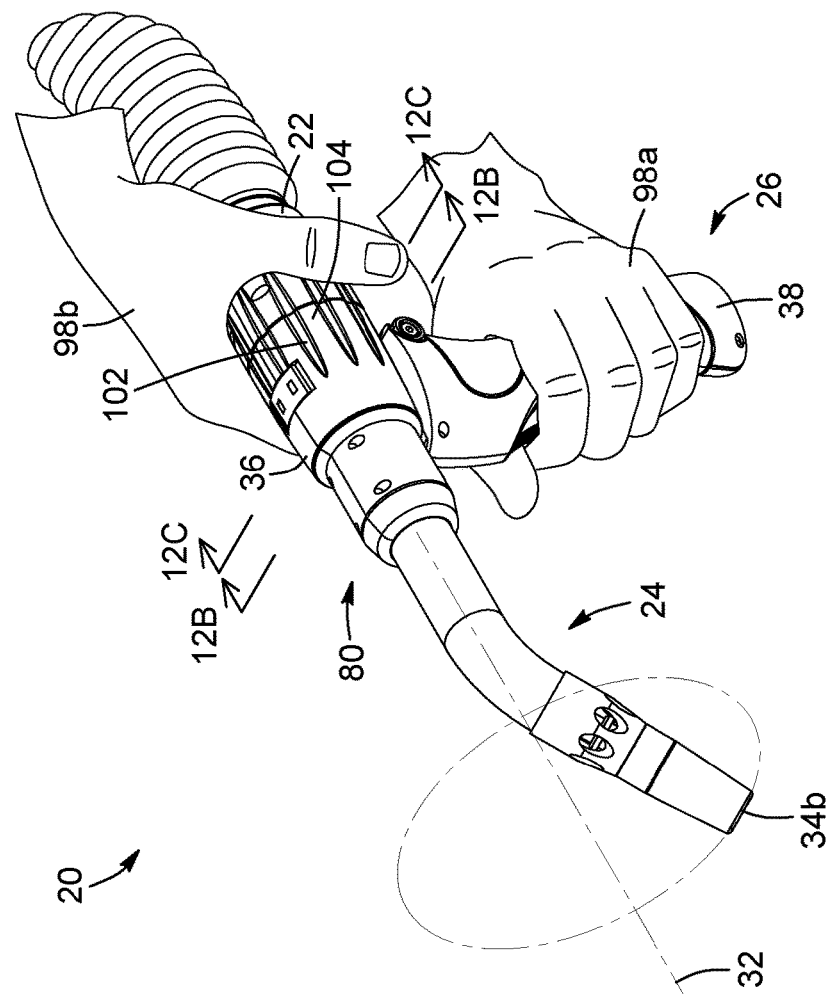
FIG. 12A is a perspective view of a welding gun, in accordance with a third preferred embodiment of the invention, depicted in a first operating position.
Figure 12G:
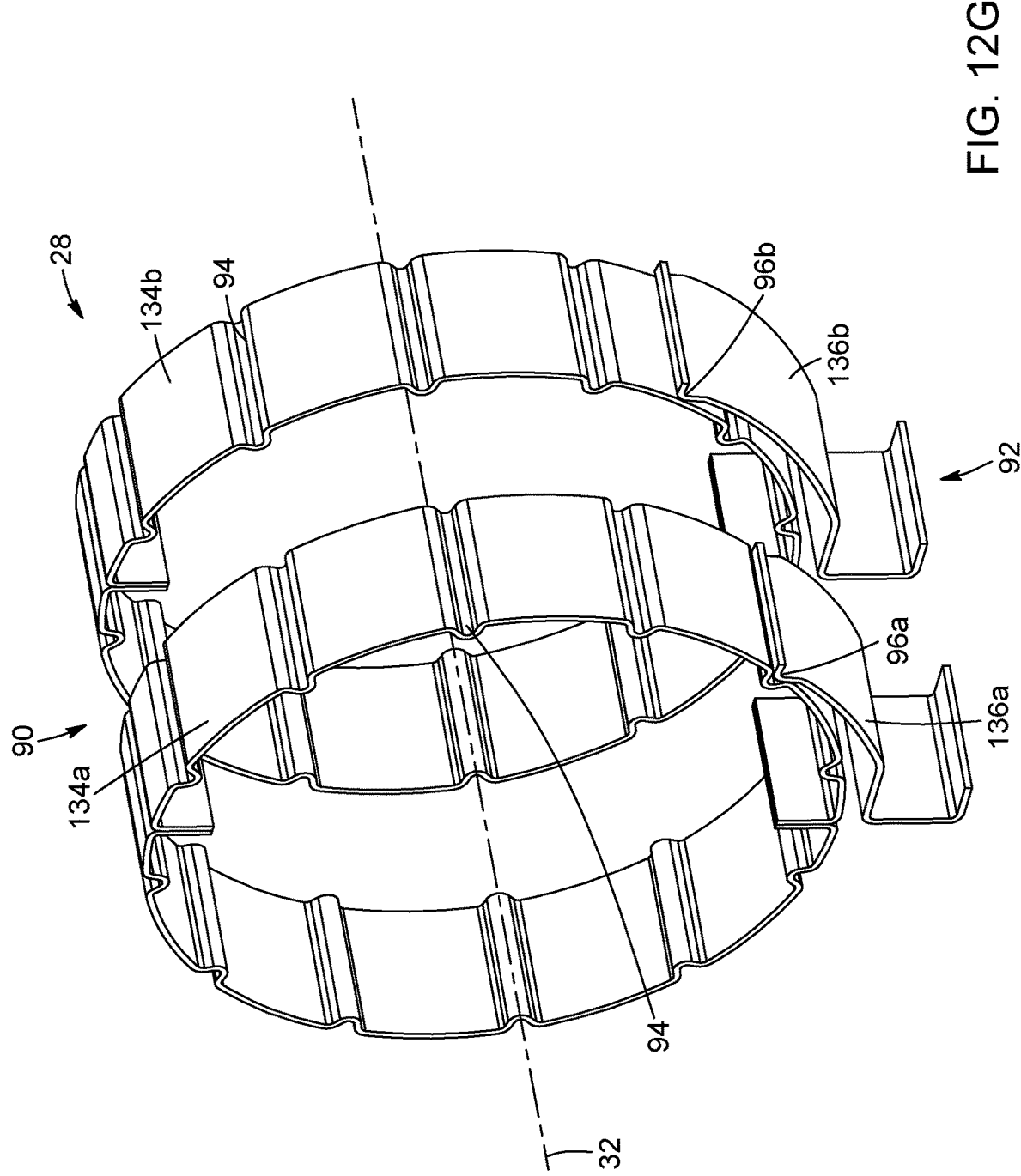
FIG. 12G is a perspective view of the rotation mechanism of the welding gun of FIGS. 12A and 12D.

FIGS. 12A and 12D are perspective views of the welding gun 20, depicted in a first and a second operating position, respectively. FIGS. 12B, 12C, 12E and 12F illustrate in more detail the rotation mechanism 28 of the third embodiment of the welding gun 20. More specifically, in FIGS. 12B, 12C, 12E and 12F, the rotation mechanism 28 is depicted at two distinct angular positions of the elongated body 22 relative to the sleeve portion 36 of the handle 26, the two angular positions corresponding to the first and second operating positions of the welding gun 20 shown in FIGS. 12A and 12D, respectively. FIG. 12G is a perspective view of the rotation mechanism 28 of the welding gun 20 of FIGS. 12A and 12D.

The features of the third embodiment of the welding gun 20 can be generally similar to like features described for the first and second embodiments and they will not be described again in detail other than to highlight differences. As for the first and second embodiments, the welding gun 20 generally includes an elongated body 22, a neck assembly 24, a handle 26 and a rotation mechanism 28, which may share similar features to those described above. The elongated body 22 has a front end 30a, a rear end 30b and a longitudinal axis 32 extending therebetween. The neck assembly 24 has a connected end 34a connectable to the front end 30a of the elongated body 22 and a free end 34b. The handle 26 includes a sleeve portion 36 and a grasping portion 38. The sleeve portion 36 is mounted coaxially and rotatably around the elongated body 22, in a fixed longitudinal relationship therewith. The grasping portion 38 extends along a length thereof radially outwardly from the sleeve portion 36.

The rotation mechanism 28 is operatively connected between an outer periphery 40 of the elongated body 22 and an inner periphery 42 of the sleeve portion 36 and allows for the elongated body 22 and the neck assembly 24 to be commonly rotated relative to the handle 26 about the longitudinal axis 32. The welding gun 20 also includes an optional hinge mechanism 118 for relative rotation of the sleeve and grasping portions 36, 38 of the handle 26 about a hinge axis 122, such as described above.

The exemplary configuration of the rotation mechanism 28 illustrated in FIGS. 12B, 12C and 12E to 12G shares many features with the rotation mechanism of the two embodiments describe above. Indeed, the rotation mechanism 28 generally includes an inner structure 90 fixedly provided along the outer periphery 40 of the elongated body 22 and an outer structure 92 fixedly provided along the inner periphery 42 of the sleeve portion 36. Also, both the inner and outer structures 90, 92 have a number of circumferentially distributed engaging elements 94, 96.

In this third embodiment, the inner structure 90 includes a first inner member 134a and a second inner member 134b longitudinally spaced from each other along the longitudinal axis 32. Each of the first and second inner member 134a, 134b is embodied by a thin metallic annular member fixedly clamped, stamped, bonded or otherwise mounted onto substantially the entire outer periphery 40 of the elongated body 22. In the illustrated embodiment, the engaging elements 94 of the inner structure 90 are embodied by inwardly directed radial recesses circumferentially distributed along each of the first and second inner members 134a, 134b. It is to be noted that the inner structure 90 in this third embodiment has essentially the same structure as in the first embodiment described above see, e.g., FIGS. 5A to 5F).

Referring still to FIGS. 12B, 12C and 12E to 12G, the outer structure 92 includes a first outer member 136a and a second outer member 136b longitudinally spaced from each other along the longitudinal axis 32. The first outer member 136a is positioned and configured for engagement with the first inner member 134a, while the second outer member 136b is positioned and configured for engagement with the second inner member 134b. Each of the first and second outer members 136a, 136b is embodied by a flexible tongue having a connected end attached to the inner periphery 42 of the sleeve portion 36 and a free end provided with a tooth-shaped engaging element 96 configured for engagement with one of the recessed engaging elements 94 formed in the corresponding one of the first and second inner members 134a, 134b.

The first and second tongue-shaped outer members 136a, 136b are positioned and sized such that, at each of the plurality of discrete angular positions of the elongated body 22 relative to the sleeve portion 36, the tooth-shaped engaging element of one of the outer members 136a, 136b (i.e., the first outer member 136a in FIG. 12B and the second outer member 136b in FIG. 12F) is an "aligned" engaging element 96a aligned with one of the engaging elements 94 of the inner structure 90. Meanwhile, the tooth-shaped engaging element of the other one of the outer members 136a, 136b (i.e., the second outer member 136b in FIG. 12C and the first outer member 136a in FIG. 12E) is an "offset" engaging element 96b located between adjacent ones of the engaging elements 94 of the inner structure 90. Namely, in the illustrated embodiment, the first outer member 136a is shorter than the second outer member 136b, but the converse could be used in another embodiment. In yet other embodiments, the first and second outer members 136a, 136b could have the same length but be connected to the inner periphery 42 of the sleeve portion 36 at different points therealong.

In FIGS. 12B, 12C and 12E to 12G, the separation between adjacent engaging elements 94 formed on the first and second inner members 134a, 134b is constant and equal to 30°. Accordingly, due to the provision of both "aligned" and "offset" engaging elements 96 in the outer structure 92, the welding gun 20 in FIGS. 12A and 12D can be rotated and locked into any one of twenty-four angular positions about the longitudinal axis 32, the angular positions being separated from one another by 15° and covering an angular span of 360°. Of course, either or both of the angular separation and span can differ in other embodiments.

FIGS. 12A and 12D show that in order to operate the rotation mechanism 28, a user can hold the grasping portion 38 of the handle 26 fixedly with one hand 98a while using the other hand 98b to rotate and lock the elongated body 22 at a specific angular position relative to the handle 26, and thus orient the neck assembly 24 of the welding gun 20 at a specific orientation with respect to the workpiece to be welded. Then, upon rotation of the elongated body 22 relative to the sleeve portion 36 from the configuration in FIG. 12A to the configuration of FIG. 12D, the aligned tooth-shaped engaging element 96a of the first outer member 136a in FIG. 12B is released from engagement with one of the recessed engaging element 94 of the first inner member 134a to become an offset engaging element 96b in FIG. 12E. At the same time, the offset tooth-shaped engaging element 96b of the second outer member 136b in FIG. 12C is brought into engagement with one of the engaging elements 94 of the second inner member 134b to become an aligned engaging element 96a in FIG. 12F.

It will be understood that, in the embodiments of the welding gun described above, the neck assembly 24, the supply cable 60, the hose conduit 62 and the gooseneck 64 may each be releasably connected to the welding gun 20. In such a case, referring to FIGS. 8A and 8B, an assembly 132 including an elongated body 22, a handle 26 and a rotation mechanism 28 may be fabricated independently and sold as a separate integrated unit for use with existing gun structures to form a welding gun such as that shown in FIG. 1. It will be understood that the structure and operation of the structures of the assembly 132 can be similar to the structure and operation of like structures described above for the first and second embodiments of the welding gun and need not be described again in detail.

Figure 8A:
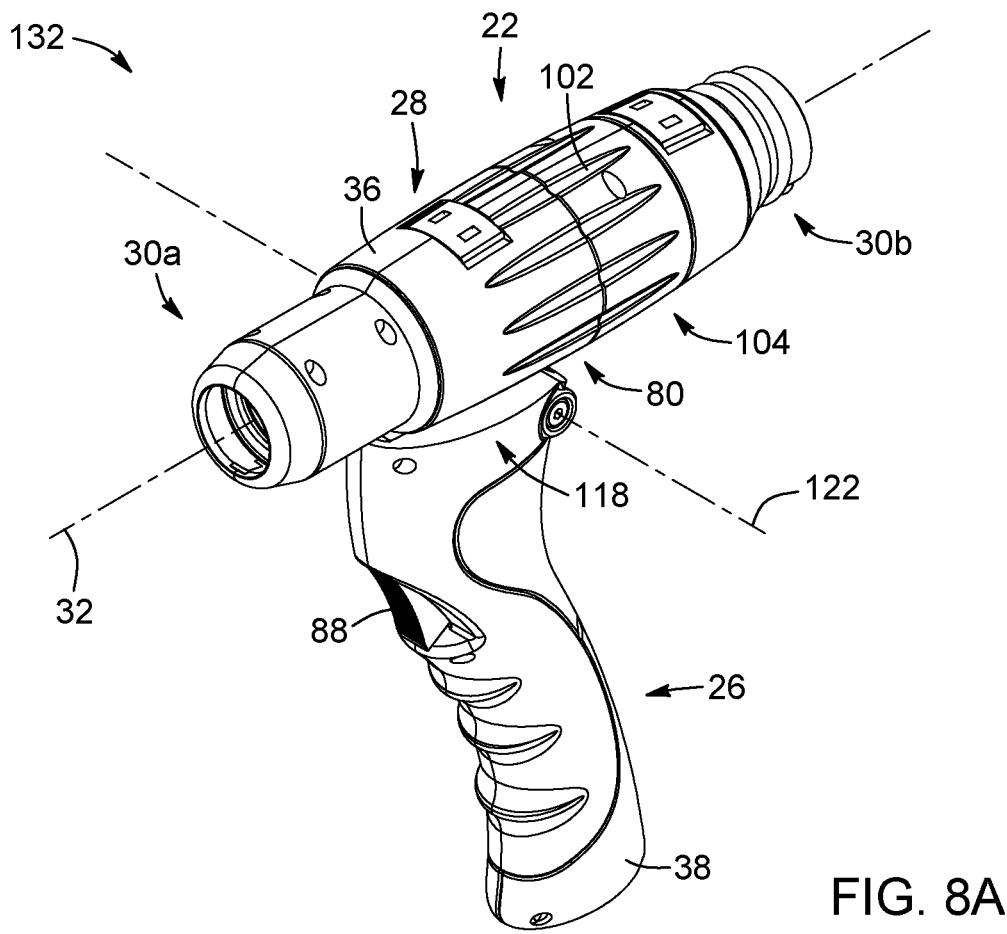
FIG. 8A is a perspective view of an assembly for use in a welding gun, in accordance with an embodiment of the invention.
Figure 8B:
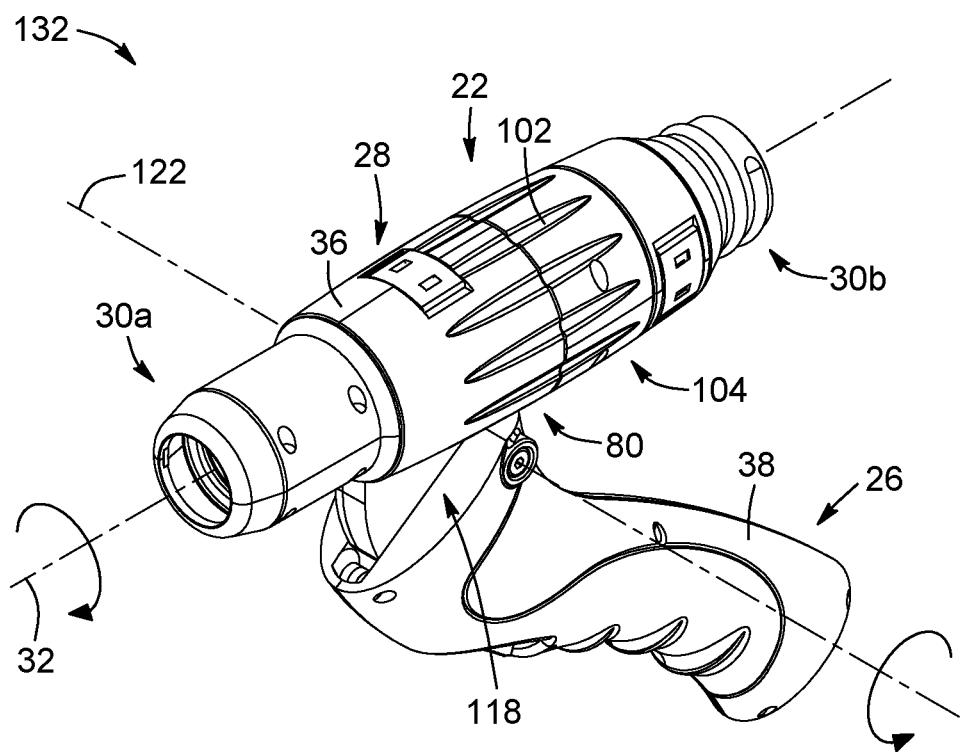
FIG. 8B is a perspective view of the assembly of FIG. 8A, in a different operating position.

Briefly, in FIGS. 8A and 8B, the elongated body 22 of the assembly 132 has a front end 30a, a rear end 30b and a longitudinal axis 32 extending therebetween, while the neck assembly 24 has a connected end 34a connectable to the front end 30a of the elongated body 22 and a free end 34b. The handle 26 includes a sleeve portion 36 and a grasping portion 38, where the sleeve portion 36 is mounted coaxially and rotatably around the elongated body 22, in a fixed longitudinal relationship therewith, while the grasping portion 38 extends along its length radially outwardly from the sleeve portion 36. The rotation mechanism 28 is operatively connected between an outer periphery of the elongated body 22 and an inner periphery of the sleeve portion 36 and allows for the elongated body 22 and the neck assembly 24 to be commonly rotated relative to the handle 26 about the longitudinal axis 32. Optionally, in some embodiments, the assembly may further be provided with a hinge mechanism 118 for relative rotation of the sleeve and grasping portions 36, 38 of the handle 26 about a hinge axis 122, such as described above.

FIG. 8A illustrates a first configuration of the assembly 132 where the elongated body 22 is in a first angular position relative to the sleeve portion 36 about the longitudinal axis 32, and the grasping portion 38 is in a first angular position relative to the sleeve portion 36 about the hinge axis 122. FIG. 8B illustrates a second configuration of the assembly 132 where the elongated body 22 is in a second angular position relative to the sleeve portion 36 about the longitudinal axis 32, and the grasping portion 38 is in a second angular position relative to the sleeve portion 36 about the hinge axis 122.

Of course, numerous modifications could be made to the embodiments described above.

The invention claimed is:
1. A welding gun comprising:
an elongated body having a front end, a rear end, and a longitudinal axis extending between the front end and the rear end;
a neck assembly having an end connectable to the front end of the elongated body;
a handle including a sleeve portion mounted coaxially around and in a fixed longitudinal relationship with the elongated body, and a grasping portion extending lengthwise radially outwardly from the sleeve portion; and a rotation mechanism operatively connected between an outer periphery of the elongated body and an inner periphery of the sleeve portion for rotating the elongated body and the neck assembly relative to the handle about the longitudinal axis, the rotation mechanism including:
  an inner structure fixedly provided along the outer periphery of the elongated body, the inner structure having a number of circumferentially distributed engaging elements; and
  an outer structure fixedly provided along the inner periphery of the sleeve portion, the outer structure having a number of circumferentially distributed engaging elements, the engaging elements of the outer structure cooperating with the engaging elements of the inner structure for releasably locking the elongated body into a plurality of discrete angular positions relative to the sleeve portion about the longitudinal axis.

2. The welding gun according to claim 1, wherein:
the engaging elements of one of the inner and outer structures include radial projections; and
the engaging elements of the other one of the inner and outer structures include radial recesses for receiving therein the radial projections.

3. The welding gun according to claim 1, wherein:
the engaging elements of one of the inner and outer structures each include a cavity, a spring-loaded detent inside the cavity and a detent spring coupled between the cavity and the spring-loaded detent; and
the engaging elements of the other one of the inner and outer structures include slots for receiving at least partly therein the spring-loaded detents.

4. The welding gun according to claim 1, wherein the number of engaging elements of the inner structure is different than the number of engaging elements of the outer structure.

5. The welding gun according to claim 4, wherein the number of engaging elements of the inner structure is greater than the number of engaging elements of the outer structure.

6. The welding gun according to claim 5, wherein the engaging elements of the inner structure are equally angularly spaced from one another.

7. The welding gun according to claim 5, wherein, at each of the plurality of discrete angular positions of the elongated body relative to the sleeve portion, the engaging elements of the outer structure are divided into:
  one or more aligned engaging elements, each aligned engaging element being circumferentially aligned with one of the engaging elements of the inner structure; and
  one or more offset engaging elements, each offset engaging element being circumferentially located between adjacent ones of the engaging elements of the inner structure.

8. The welding gun according to claim 7, wherein each offset engaging element is circumferentially located halfway between the adjacent ones of the engaging elements of the inner structure.

9. The welding gun according to claim 7, wherein:
the inner structure includes a first and a second inner member longitudinally spaced from each other along the longitudinal axis;

the outer structure includes a first and a second outer member longitudinally spaced from each other along the longitudinal axis; and
the one or more aligned engaging elements are provided on one of the first and second outer members of the outer structure and the one or more offset engaging elements of the outer structure are provided on the other one of the first and second outer members of the outer structure.

10. The welding gun according to claim 1, wherein the plurality of discrete angular positions of the elongated body relative to the sleeve portion are separated from one another by an angle ranging between 7.5° and 15°.

11. The welding gun according to claim 1, wherein the plurality of discrete angular positions of the elongated body relative to the sleeve portion cover an angular span ranging from 30° to 360°.

12. The welding gun according to claim 1, further comprising a hinge mechanism including:
  a hinge member having a hinge axis extending perpendicularly to both the longitudinal axis of the elongated body and a length of the grasping portion, the hinge member rotatably connecting the sleeve portion and the grasping portion of the handle to each other about the hinge axis; and
  a locking member including a first locking element fixedly coupled to the sleeve portion and a second locking element fixedly coupled to the grasping portion, the first locking element and the second locking element cooperating with each other for releasably locking the grasping portion into a number of discrete angular positions relative to the sleeve portion about the hinge axis.

13. The welding gun according to claim 12, wherein the first and second locking elements have mutually engageable toothed surfaces.

14. The welding gun according to claim 13, wherein the first locking element is a flexible locking tooth and the second locking element is a rigid locking arm and has a number of teeth on the toothed surface thereof, the number of teeth on the toothed surface of the second locking element determining the number of discrete angular positions of the grasping portion relative to the sleeve portion about the hinge axis.

15. The welding gun according to claim 12, wherein the plurality of discrete angular positions of the grasping portion relative to the sleeve portion are separated from each other by an angle ranging between 5° and 15°.

16. The welding gun according to claim 12, wherein the plurality of discrete angular positions of the grasping portion relative to the sleeve portion cover an angular span ranging from 20° to 60°.

17. An assembly for use in a welding gun, the assembly comprising:
  an elongated body having a front end, a rear end, and a longitudinal axis extending between the front end and the rear end;
  a handle including a sleeve portion mounted coaxially around and in a fixed longitudinal relationship with the elongated body, and a grasping portion extending lengthwise radially outwardly from the sleeve portion; and
  a rotation mechanism operatively connected between an outer periphery of the elongated body and an inner periphery of the sleeve portion of the handle for rotating the elongated body relative to the handle about the longitudinal axis, the rotation mechanism including:

an inner structure fixedly provided along the outer periphery of the elongated body, the inner structure having a number of circumferentially distributed engaging elements; and an outer structure fixedly provided along the inner periphery of the sleeve portion of the handle, the outer structure having a number of circumferentially distributed engaging elements, the engaging elements of the outer structure cooperating with the engaging elements of the inner structure for releasably locking the elongated body into a plurality of discrete angular positions relative to the sleeve portion about the longitudinal axis.

18. The assembly according to claim 17, further comprising a hinge mechanism including:

a hinge member having a hinge axis extending perpendicularly to both the longitudinal axis of the elongated body and a length of the grasping portion, the hinge member rotatably connecting the sleeve portion and the grasping portion of the handle to each other about the hinge axis; and a locking member including a first locking element fixedly coupled to the sleeve portion and a second locking element fixedly coupled to the grasping portion, the first locking element and the second locking element cooperating with each other for releasably locking the grasping portion into a number of discrete angular positions relative to the sleeve portion about the hinge axis.

19. The assembly according to claim 17, wherein:

the engaging elements of one of the inner and outer structures include radial projections; and the engaging elements of the other one of the inner and outer structures include radial recesses for receiving therein the radial projections.

20. The assembly according to claim 17, wherein:

the engaging elements of one of the inner and outer structures each include a cavity, a spring-loaded detent inside the cavity and a detent spring coupled between the cavity and the spring-loaded detent; and the engaging elements of the other one of the inner and outer structures include slots for receiving at least partly therein the spring-loaded detents.

* * * * *